US011988165B2

(12) United States Patent
Dölker

(10) Patent No.: US 11,988,165 B2
(45) Date of Patent: May 21, 2024

(54) METHOD FOR OPERATING AN INTERNAL COMBUSTION ENGINE, INJECTION SYSTEM FOR AN INTERNAL COMBUSTION ENGINE AND INTERNAL COMBUSTION ENGINE HAVING AN INJECTION SYSTEM

(71) Applicant: Rolls-Royce Solutions GmbH, Friedrichshafen (DE)

(72) Inventor: Armin Dölker, Friedrichshafen (DE)

(73) Assignee: Rolls-Royce Solutions GmbH, Friedrichshafen (DE)

( * ) Notice: Subject to any disclaimer, the term of this patent is extended or adjusted under 35 U.S.C. 154(b) by 61 days.

(21) Appl. No.: 17/478,024

(22) Filed: Sep. 17, 2021

(65) Prior Publication Data

US 2022/0042476 A1 Feb. 10, 2022

Related U.S. Application Data

(63) Continuation of application No. PCT/EP2020/056995, filed on Mar. 13, 2020.

(30) Foreign Application Priority Data

Mar. 19, 2019 (DE) ..................... 10 2019 203 740.2

(51) Int. Cl.
*F02D 41/38* (2006.01)
*F02D 41/22* (2006.01)

(52) U.S. Cl.
CPC ......... *F02D 41/3809* (2013.01); *F02D 41/22* (2013.01); *F02D 2200/0602* (2013.01)

(58) Field of Classification Search
CPC ...... F02D 41/1432; F02D 41/22; F02D 41/38; F02D 41/3809; F02D 41/3845; F02D 41/3863; F02D 2200/0602; F02D 2250/04
See application file for complete search history.

(56) References Cited

U.S. PATENT DOCUMENTS

| | | | | |
|---|---|---|---|---|
| 2004/0020281 | A1 | 2/2004 | Schilling et al. | |
| 2010/0280743 | A1 * | 11/2010 | Hehle | G01L 23/24 123/456 |
| 2012/0265424 | A1 * | 10/2012 | Dolker | F02M 63/025 701/104 |

(Continued)

FOREIGN PATENT DOCUMENTS

| | | | |
|---|---|---|---|
| DE | 195 48 279 A1 | 4/1997 | |
| DE | 10 2015 207 961 A1 | 11/2016 | |
| JP | 2000-18139 A | 1/2000 | |

OTHER PUBLICATIONS

International Search Report and Written Decision from the International Searching Authority dated May 28, 2020 for International Application No. PCT/EP2020/056995 (13 pages).

*Primary Examiner* — John Kwon
*Assistant Examiner* — Johnny H Hoang
(74) *Attorney, Agent, or Firm* — Taylor IP, P.C.

(57) ABSTRACT

A method for operating an internal combustion engine with a high pressure accumulator for a fuel injection system, includes the steps of: monitoring, in a time-dependent manner, a high pressure in the fuel injection system; conducting a check, at a high pressure-dependent starting time point, as to whether a continuous injection detection is to be carried out; and checking whether a high-pressure oscillation has occurred within an oscillation time interval prior to a starting time.

8 Claims, 10 Drawing Sheets

(56) References Cited

U.S. PATENT DOCUMENTS

| | | | | |
|---|---|---|---|---|
| 2017/0067409 | A1* | 3/2017 | Dölker | F02D 41/3863 |
| 2018/0010542 | A1 | 1/2018 | Dölker | |
| 2018/0238260 | A1* | 8/2018 | Seegmüller | F02D 41/3863 |
| 2019/0136784 | A1* | 5/2019 | Dölker | F02D 41/222 |
| 2020/0116097 | A1* | 4/2020 | Dölker | F02D 41/221 |

* cited by examiner

METHOD FOR OPERATING AN INTERNAL COMBUSTION ENGINE, INJECTION SYSTEM FOR AN INTERNAL COMBUSTION ENGINE AND INTERNAL COMBUSTION ENGINE HAVING AN INJECTION SYSTEM

CROSS REFERENCE TO RELATED APPLICATIONS

This is a continuation of PCT application No. PCT/EP2020/056995, entitled "METHOD FOR OPERATING AN INTERNAL COMBUSTION ENGINE, INJECTION SYSTEM FOR AN INTERNAL COMBUSTION ENGINE AND INTERNAL COMBUSTION ENGINE HAVING AN INJECTION SYSTEM", filed Mar. 13, 2020, which is incorporated herein by reference.

BACKGROUND OF THE INVENTION

1. Field of the Invention

The invention relates to a method for operating an internal combustion engine, injection system for an internal combustion engine, and an internal combustion engine having an injection system.

2. Description of the Related Art

From German disclosure document DE 10 2015 207 961 A1 a method is known for operating an internal combustion engine, by way of which continuous injecting during operation of the internal combustion engine can be detected. A problem presents itself herein in that oscillations of a high pressure in the injection system can lead to an erroneous detection of a continuous injection. It is in particular possible that such an injection system is equipped on the low pressure side with a fuel filter, in order to filter water out of the fuel. As a secondary effect, air is also filtered out of the fuel which initially accumulates in the low pressure region, and which is subsequently pumped by a high pressure pump into a high pressure accumulator of the injection system. Thereupon, high pressure oscillation can occur in the high pressure accumulator, wherein in particular the measured high pressure can abruptly collapse, when air gets into the region of a high pressure senor. It is then possible that, according to the method described in DE 10 2015 207 961 A1 a continuous injection is detected which in turn results in that a warning signal is set, and the internal combustion engine is possibly shut off, even though in actual fact no continuous injection is occurring.

What is needed in the art is to create a method for operating an internal combustion engine, an injection system for an internal combustion engine, and an internal combustion engine, wherein the aforementioned disadvantages are avoided. In particular, what is needed in the art is to avoid erroneous detection—that is, a false-positive detection of a continuous injection—or at least reduce the risk for such a false-positive detection of a continuous injection.

SUMMARY OF THE INVENTION

The present invention provides a method for operating an internal combustion engine, wherein an internal combustion engine is operated which includes an injection system with a high pressure accumulator, wherein a high pressure in the injection system is monitored in a time-dependent manner. At a high-pressure-dependent start time, a check is conducted as to whether continuous injection detection is to be performed. In order to verify whether the continuous injection detection is to be carried out, it is examined whether a high-pressure oscillation has occurred within an oscillation time interval prior to the starting time. With the assistance of the herein proposed method it is thus possible to consider the occurrence of high pressure oscillations in determining whether continuous injection is present. In particular, the method can be used to prevent the continuous injection detection process from being carried out if a high-pressure oscillation is detected. Thus, the risk of a false-positive detection of continuous injection is advantageously reduced. False-positive detection of continuous injection can be prevented. Again, unnecessary setting of an alarm signal and possibly even shutting off of the internal combustion engine in the absence of a real valid reason can be avoided, or it is at least possible to reduce the risk that such an incident occurs.

A high pressure oscillation is herein understood to be in particular a certain variation of the high pressure in the high pressure accumulator of the injection system, wherein the high pressure within the oscillation time interval can have crossed a predetermined value range, in particular a predetermined pressure value band, at least once from both sides, in other words from above and from below, optionally first from below and then from above. A strict intermittency or symmetry of the high pressure progression does optionally not have to be present. In particular, it is optionally sufficient for the detection of a high pressure oscillation that the high pressure has crossed the predetermined pressure value band within the oscillation time interval once, first from a lower pressure value band limit value to at least an upper pressure value band limit value and thereafter from the upper pressure value band limit value to the lower pressure value band limit value or to a further pressure limit value below or above the lower pressure value band limit value.

The oscillation time interval is in particular a predetermined time interval which is selected in a manner suitable to avoid on the one hand a false-positive detection of continuous injection due to high pressure oscillation, and on the other hand not to interfere with the detection of an actually occurring continuous injection. The oscillation time interval is optionally at least 0.5 s to 1.5 s maximum, optionally one second.

The high pressure dependent start time is in particular a point in time at which it is decided on the one hand as to whether the continuous injection detection is to be carried out; and wherein on the other hand, if the continuous injection detection is to be carried out, the continuous injection detection starts. The fact that the starting time is high pressure dependent means on the one hand that the high pressure value at which the assessment as to whether a continuous injection detection is to be carried out—or the continuous injection detection itself is to be started—id parametrizable; wherein on the other hand the start time is high pressure dependent to the extent that this assessment is performed when the high pressure reaches or falls below the parameterizable high pressure value.

The fact that the oscillation time interval occurs before the start time means in particular that the start time is at the same time an end time point of the oscillation time interval. Thus, this is designed as a sliding time window which, originating from the start time extends into the past.

Within the scope of the method an internal combustion engine can be operated which includes a so-called common rail injection system. A high pressure accumulator is provided for fuel and is fluidically connected with at least one injector, optionally with a plurality of injectors, for injection of the fuel. The high pressure accumulator acts as a buffer volume in order to buffer and dampen pressure fluctuations caused by individual injection events. For this purpose it is provided that the fuel volume in the high pressure accumulator is large compared to a fuel volume injected within an individual injection event. In particular, if several injectors are provided, the high pressure accumulator ensures in an advantageous manner decoupling of the injection events which are allocated to various injectors, so that each individual injection event can optionally originate from an identical high pressure. In addition it is possible that the at least one injector includes an individual reservoir. In particular, it is optional that several injectors respectively have individual reservoirs separately allocated to the injectors. These serve as additional buffer volumes and can very efficiently cause additional separation of the individual injection events.

The fact that the high pressure in the injection system is monitored in a time dependent manner means in particular, that it is measured in a time dependent manner. For this purpose the high pressure in the high pressure accumulator can be measured, in particular by way of a pressure sensor located on the high pressure accumulator. The high pressure accumulator turns out to be an especially suitable location for measuring the high pressure, in particular since here only to a small extent short-term pressure fluctuations are detectable due to the damping effect of the high pressure accumulator upon the individual injection events.

Within the scope of the method it is optional that the measured raw values are not used as the high pressure, but that the measured high pressure values are filtered, wherein the filtered high pressure values are used as the basis for the method. A $PT_1$-filter can be used for this. This filtration offers the advantage that short-term high pressure fluctuations can be filtered out, which otherwise could interfere with a reliable detection of a high pressure oscillation or a drop in the high pressure, indicating an actual continuous injection. It is possible that the detected high pressure values during operation of the internal combustion engine are also filtered for pressure regulation of the high pressure. For filtering for the purpose of pressure regulation, a first filter can be provided which can be designed as a $PT_1$-filter, wherein a second filter which can be designed as a $PT_1$-filter is provided for the purpose of detection of a high pressure oscillation or continuous injection. The second filter herein can be designed as a faster filter, in other words one that reacts more dynamically to the measured high pressure values, wherein it has in particular a smaller time constant than the first high pressure filter which is used for pressure regulation of the high pressure. The output pressure values of the filter used to detect a high pressure oscillation or continuous injection are here, and in the following also referred to as dynamic high pressure or dynamic rail pressure. The term "dynamic" indicates in particular that filtering occurs with a comparatively fast time constant, so that very short-term fluctuations are in fact averaged out, that however at the same time also a comparatively dynamic detection of the actual currently present high pressure is provided.

According to a further development of the present invention, continuous injection detection is carried out if within the oscillation time interval no high pressure oscillation is detected. It is thus ensured that checks for continuous injection are conducted, if continuous injection is possibly occurring due to the time-dependent behavior of the high pressure and if, at the same time, high pressure oscillation is excluded as the cause of the time-dependent behavior of the high pressure. Continuous injection detection is not performed if a high pressure oscillation is detected within the oscillation time interval. Thus, advantageously, checking for a continuous injection already ceases if a high pressure oscillation is detected as the reason for the time dependent behavior of the high pressure. Not only can thereby an erroneous setting of an alarm signal or even shutting off of the internal combustion engine due to a false-positive detection of continuous injection be avoided, but at the same time calculation time and computing power can also be saved by preventing checks regarding continuous injections.

According to a further development of the present invention it is provided that, for detection of a high pressure oscillation it is checked whether the high pressure—within the oscillation time interval—originating from a predetermined oscillation limit value below a high pressure target value, which is also referred to as target high pressure, has exceeded the high pressure target value and has subsequently dropped to a predetermined oscillation end value below the high pressure target value. At the same time this represents a simple and practical definition of a high pressure oscillation or respectively a simple and practicable criterion for recognition of a high pressure oscillation. In particular, the oscillation limit value can herein be the aforementioned lower pressure value band limit value; the high pressure target value can be the aforementioned upper pressure value band limit value; the oscillation end value, which can be the aforementioned additional pressure limit value, can however also be identical with the lower pressure value band limit value. The high pressure target value can be a value which is used for pressure regulation of the high pressure in the high pressure accumulator.

The oscillation limit value and also the oscillation end value are in particular smaller than the high pressure target value. According to the arrangement of the method it is possible that the oscillation end value is equal to the oscillation limit value. According to another arrangement of the method it is possible that the oscillation end value is different from the oscillation limit value, in particular smaller or greater.

On the basis of the herein presented criterion it becomes clear that for the presence of high pressure oscillation no strict intermittency is required for the temporal development of the high pressure. In particular, no oscillation in the sense of a strictly predetermined temporal progression, for example a trigonometric progression, is required. The oscillation time interval is so to speak especially a maximum periodic duration—also when possibly related to only one oscillation cycle or a few oscillation cycles—wherein only such high pressure fluctuations are recognized as high pressure oscillations whose periodic duration is shorter than the maximum periodic duration defined by the oscillation time interval. The oscillation time interval thereby virtually determines a minimum frequency for the high pressure fluctuation that is to be recognized as a high pressure oscillation.

According to a further development of the invention it is provided that, after detection of a high pressure oscillation, continuous injection detection is blocked until the high pressure again reaches or exceeds the high pressure target value. This ensures that the injection system after the presence of a high pressure oscillation returns to a defined condition—in particular possibly present air moved out of the high pressure accumulator—before a check regarding continuous injection is carried out. This also contributes advantageously to prevention of erroneous detections of continuous injections.

According to a further development of the invention it is provided that the starting time is selected as a time point at which the high pressure drops below the high pressure target value by a predetermined starting differential pressure amount. In this way, the start time is defined in a reliable, logical and parameterizable manner. The high pressure is evaluated in a time-dependent manner, wherein the decision as to whether a continuous injection detection is to be performed is made and the continuous injection check possibly starts if the high pressure drops below the high pressure target value by the predetermined starting differential pressure amount. Thereby an unnecessary and thus uneconomical actuation of the checking steps through slight fluctuations of the high pressure from the high pressure target value can be avoided. The predetermined starting differential pressure amount can readily be selected in a meaningful manner so that the checking process is started only if in fact a pressure drop is feared that exceeds usual fluctuations from the high pressure target value.

According to a further development of the invention it is provided that the oscillation limit value is less than a starting high pressure which is defined as the difference between the high pressure target value and the starting differential pressure amount. The starting high pressure is thus the high pressure value that defines the starting time, when the time-dependently detected high pressure reaches or drops below the starting high pressure of higher pressure values. Alternatively, it is optionally provided that the oscillation limit value is greater than the starting high pressure. The oscillation limit value is optionally parameterizable and can in particular—depending on a specific application of the method, in particular in a specific internal combustion engine—be selected to be greater or smaller than the starting high pressure. Naturally, it is also possible that the oscillation limit value is the same as the starting high pressure.

According to an optionaly arrangement, the oscillation end value is selected to be the same as the starting high pressure. The oscillation end value is optionally also parameterizable, wherein an especially simple arrangement of the method is then provided, if said value is selected to be identical to the starting high pressure, or if the starting high pressure is used as oscillation end value.

A optional arrangement provides that the oscillation limit value, the oscillation end value and/or the starting high pressure are defined as differential amounts, originating from the high pressure target value. This allows for an especially simple parameterization of the method. In particular it is therewith ensured that, in the case of a varying high pressure target value, fixed differential amounts based on the high pressure target value remain valid for the other values. The oscillation limit value is thus optionally defined as oscillation differential pressure amount—based on the high pressure target value—, and the oscillation end value is optionally defined as end oscillation differential pressure amount, also based on the high disparity to the current high pressure target value. The respective pressure value is optionally always deducted from the high pressure target value. A corresponding differential pressure amount is thus positive if the corresponding pressure value is smaller than the high pressure target value. Accordingly, a control deviation for the pressure control is computed in such a way that the current high pressure is deducted from the high pressure target value, so that the control deviation is positive if the current pressure value is less than the high pressure target value.

Continuous injection detection is optionally performed as explained in disclosure document DE 10 2015 207 961 A1. In this regard we refer you in particular to this document.

For detection of continuous injection, checks are optionally conducted as to whether the high pressure within a predetermined continuous injection time interval has dropped by a predetermined continuous injection differential pressure amount. It is also—optionally continuously—checked whether a pressure limiting valve which connects the high pressure accumulator with a fuel reservoir has responded. A continuous injection is detected if within a predetermined check time interval, no pressure limiting valve has responded before the drop of the high pressure and if the high pressure within the predetermined continuous injection time interval has dropped by the predetermined continuous injection differential pressure amount. Because a continuous injection is detected, if simultaneously with the drop of the high pressure it is also recognized that within a predetermined check time interval no pressure limiting valve has responded prior to the drop of the high pressure by the predetermined continuous injection differential pressure amount, it can be reliably ruled out that the detected drop of the high pressure can be attributed to another event, namely the actuation of a pressure limiting valve.

It is herein optional, that within the scope of the method continuous injection is detected only if both conditions are met simultaneously, namely that on the one hand the high pressure within the predetermined continuous injection time interval has dropped by the predetermined continuous injection differential pressure amount, wherein on the other hand no pressure limiting valve has responded within the predetermined check time interval prior to the drop of the high pressure. Thus, continuous injection can be concluded with great certainty to be the cause for the drop of the high pressure, wherein the continuous injection is detected and diagnosed due to the drop in the high pressure. After detection of the continuous injection it is then readily possible to initiate measures which protect the internal combustion engine from damage.

As a check time interval, a time interval of at least one second to at most three seconds, optionally of two seconds, can be used. This time has turned out to be especially favorable in order to be able to rule out that the detected pressure drop was caused by the actuation of a pressure limiting valve.

The fact that the check time interval occurs before the drop of the high pressure means in particular, that the check time interval occurs before the starting time, wherein the starting time is at the same time optionally the check time interval. Thus, this is designed as a sliding time window which, originating from the start time extends into the past.

The fact that constant checking occurs as to whether a pressure limiting valve connecting the high pressure accumulator with a fuel reservoir is actuated means, that within the scope of the method it is monitored constantly, in particular continuously or at predetermined time intervals.

As the pressure limiting valve, a pressure relief valve is optionally used, in particular a mechanical pressure relief valve and/or a controllable pressure control valve and/or two controllable pressure relief valves. It is possible that the injection system has only one mechanical pressure relief valve which responds above a predetermined overpressure relief-pressure value and relieves the high pressure accumulator of pressure toward the fuel reservoir. This serves as the safety of the injection system and prevents impermissible high pressures in the high pressure accumulator.

Alternatively or in addition it is possible that as the pressure limiting valve at least one controllable pressure control valve is provided. In normal operation of the internal combustion engine this can serve to provide a disturbance variable in the form of a certain fuel flow from the high pressure accumulator into the fuel reservoir, in order to stabilize a pressure regulation that is effected for example via a suction throttle that is allocated to a high pressure pump, wherein it is in particular possible that the suction throttle serves as a first pressure control element in a high pressure control circuit, wherein the controllable pressure control valve is actuated as a second pressure control element. It is possible that, during regular operation, in the event of a suction throttle failure the controllable pressure control valve assumes total control of the high pressure, optionally by way of a second high pressure control circuit which actuates the controllable pressure control valve as the sole pressure control element. A suction throttle failure is recognized in that the high pressure increases over a predetermined control relief-pressure value. In this case the controllable pressure control valve is actuated for the purpose of pressure control and is typically opened wider than is the case when—as only a second pressure control element—it produces a disturbance variable during normal operation.

In particular if no mechanical pressure relief valve, but however at least one controllable pressure control valve, is provided, it is possible that the latter also assumes the safety function of the mechanical pressure relief valve. In this case, the controllable pressure control valve is optionally actuated to open when the high pressure exceeds a predetermined overpressure relief-pressure value, so that the high pressure accumulator can be pressure-relieved into the fuel reservoir.

It is apparent that the high pressure drops at least over the short term, when the mechanical pressure relief valve opens, and/or when the at least one controllable pressure control valve is actuated either for the first time for pressure control or for pressure relief of the high pressure accumulator according to the safety function of a pressure relief valve. So that such a pressure drop is not erroneously recognized as continuous injection, checks are carried out within the scope of the method, in particular continuously as to whether a pressure limiting valve has actuated, wherein continuous injection is detected only if no pressure limiting valve has actuated during the predetermined check time interval.

An embodiment of the method is optional which is characterized in that the continuous injection verification as to whether the high pressure has dropped within the predetermined continuous injection time interval by the predetermined continuous injection differential pressure amount is performed only if no pressure limiting valve has actuated in the predetermined verification time interval prior to the start time. Thus, in this embodiment of the method, not only is continuous injection not detected in the event that a pressure limiting valve has responded in the check interval, but rather the check to determine whether the high pressure has dropped is not subsequently carried out if a pressure limiting valve has actuated previously. This embodiment of the method is especially economical because calculating time and computer resources can be saved in this manner.

The continuous injection check is started at the start time when the high pressure falls below the high pressure target value by the predetermined starting differential pressure amount.

One embodiment of the method is also optional which is characterized in that in verifying whether a pressure limiting valve has actuated a check is carried out, as to whether the high pressure in the check time interval has reached or exceeded a predetermined limiting pressure amount. As already explained previously, a pressure limiting valve responds especially when a predetermined limiting pressure limit value or pressure amount is exceeded. Depending on the type and number of pressure limiting valves in the injection system, various limiting pressure amounts can be used within the scope of the method. For example, an overpressure relief-pressure value is optionally used as a limiting pressure amount that is arranged for actuation of a mechanical pressure relief valve, if one is provided. Alternatively, or in addition—possibly different from the first overpressure relief-pressure value—a second overpressure relief-pressure value is used for actuation of a controllable pressure control valve, if this assumes the safety function of a mechanical pressure relief valve for the injection system, wherein in this case optionally no mechanical pressure relief valve is provided. Alternatively or additionally, a control relief-pressure value is optionally used for the actuation of a controllable pressure control valve, which is defined in such a way that at this pressure amount the pressure control valve is controlled as the sole pressure control element if, for example, a suction throttle fails, and the pressure control is to occur solely via the controllable pressure control valve. It is clear that exceeding at least one of these limiting pressure values results in that the respective pressure limiting valve responds. Subsequently, a pressure drop occurs, which is not to be allocated erroneously to a continuous injection event. It is therefore expedient to check, if during the check time interval at least one of the predetermined limiting pressure amounts were reached or exceeded.

One embodiment of the method is also optional which is characterized in that, after a continuous injection verification—optionally regardless of the result of the verification, in other words regardless of whether a continuous injection was in fact detected, or whether the verification produced a negative result, in other words reported the absence of continuous injection—a following continuous injection check is carried out only when the high pressure has again reached or exceeded the high pressure target value.

The present invention also provides an injection system for an internal combustion engine, which has at least one injector, and at least one high pressure accumulator which, on the one hand is fluidically connected with the at least one injector and on the other hand via a high pressure pump with a fuel reservoir. The injection system also has a high pressure sensor which is designed and arranged to detect a high pressure in the injection system, in particular in the fuel reservoir. The injection system also includes a control unit which is operatively connected with the at least one injector and with the high pressure sensor. The control unit is designed to monitor the high pressure in the injection system in a time-dependent manner, and to verify at a high pressure-dependent start time, whether continuous injection is to be performed in that a check is conducted as to whether a high pressure oscillation has occurred before the start time within an oscillation time interval.

The injection system, in particular the control unit, is designed to perform a method according to the present invention, or according to one of the previously described embodiments of the method for operating an internal combustion engine. In connection with the injection system there are advantages which were already discussed in connection with the method.

One design example of the injection system is optional which is characterized in that the at least one pressure limiting valve is selected from a group consisting of one mechanical relief valve and at least one pressure control valve. Optional is also a design example of the injection system, wherein a mechanical pressure relief valve and at least one controllable pressure control valve are provided. Also optional is a design example of the injection system, wherein only one mechanical pressure relief valve and no controllable pressure control is provided. Moreover, a design example of the injection system is optional, wherein at least one controllable pressure control valve and no mechanical pressure relief valve is provided.

The control unit is designed to check whether one of the present pressure limiting valves has actuated. It is designed in particular to check whether a mechanical pressure relief valve and/or a controllable pressure control valve have actuated.

The present invention also provides an internal combustion engine, which includes an injection system according to the invention or an injection system according to one of the previously described design examples. In connection with the internal combustion engine advantages are essentially achieved, which were already described in connection with the method and the injection system.

It is possible that the injection system has a separate control unit, which is arranged in the previously described manner. Alternatively or in addition, it is possible that the previously described functionality is integrated into a control unit of the internal combustion engine, or that the control unit is designed as control unit of the internal combustion engine. It is optional for the previously described functionality to be integrated into a central control unit of the internal combustion engine (engine control unit—ECU), or for the control unit to be designed as a central control unit of the internal combustion engine.

It is possible, that the previously described functionality is implemented into an electronic structure, in particular into hardware of the control unit. Alternatively or in addition, it is possible that a computer program product is loaded into the control unit, said program including directives based on which the previously described functionality and in particular the previously described process steps are carried out when the computer program product runs in the control unit.

In this regard, a computer program product is optional which provides machine-readable instructions, based on which the previously described functionality and in particular the previously described process steps are carried out when the computer program product runs in a computing device, in particular a control unit.

Moreover, a storage medium is also optional which is included in such a computing program product.

The description of the method on the one hand, and of the injection system and the internal combustion engine on the other hand, are to be understood complementary to one another. Process steps which were described in an explicit or implied manner in connection with the injection system and/or the internal combustion engine can be individual or combined steps in an optional embodiment of the method. Features of the injection system and/or the internal combustion engine which were described in an explicit or implied manner in connection with the method can be individual or combined features of an optional design example of the injection system or the internal combustion engine. The method is characterized optionally by at least one process step which is contingent upon at least one feature of the injection system and/or the internal combustion engine. The injection system and/or the internal combustion engine are characterized optionally by at least one feature which is contingent upon at least one process step of the inventive method, or of an optional embodiment of the method.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Figure 4:
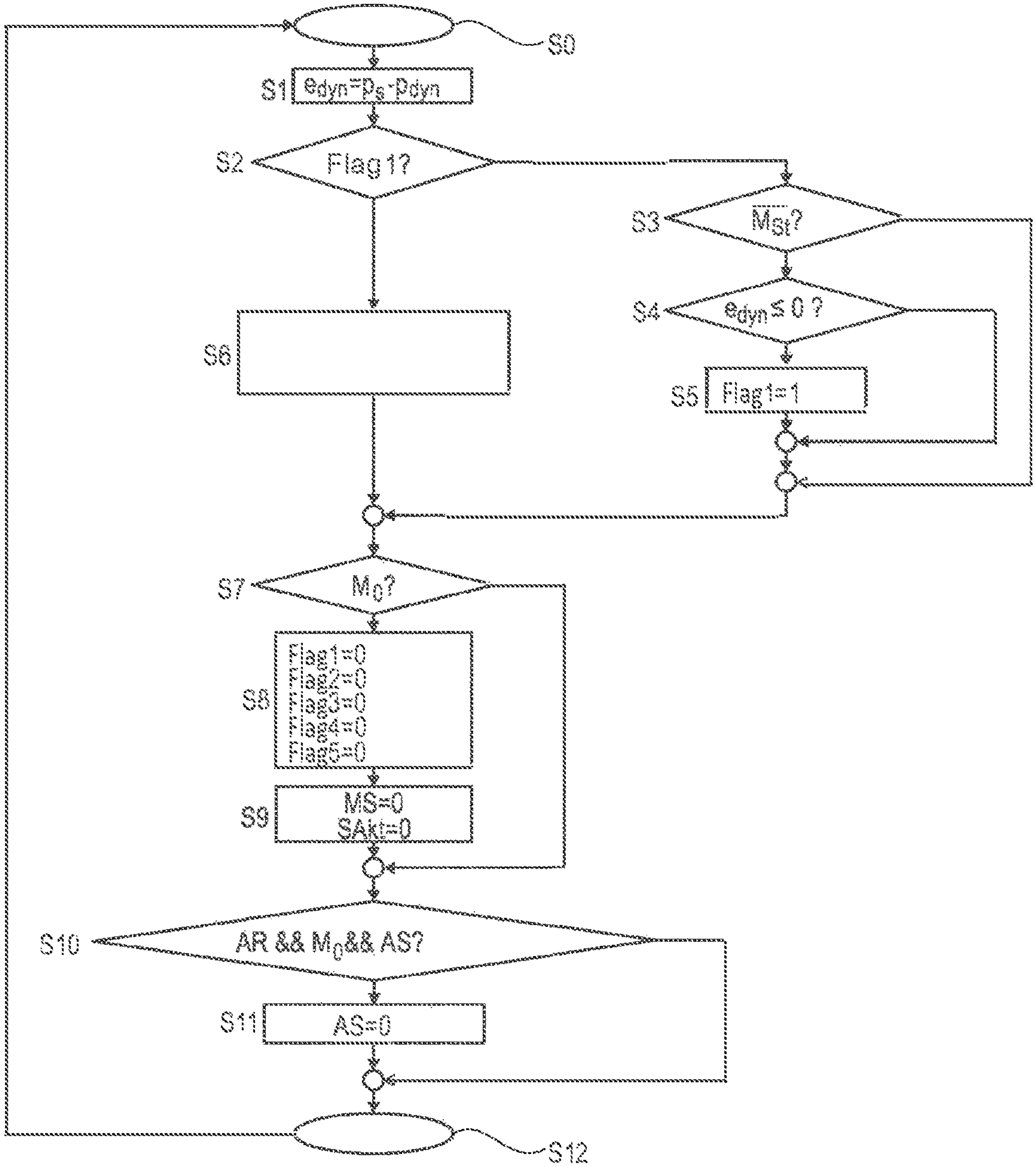
FIG. 4 is a schematic overview in the form of a flow chart, of one embodiment of a method for operating an internal combustion engine.
Figure 5A:
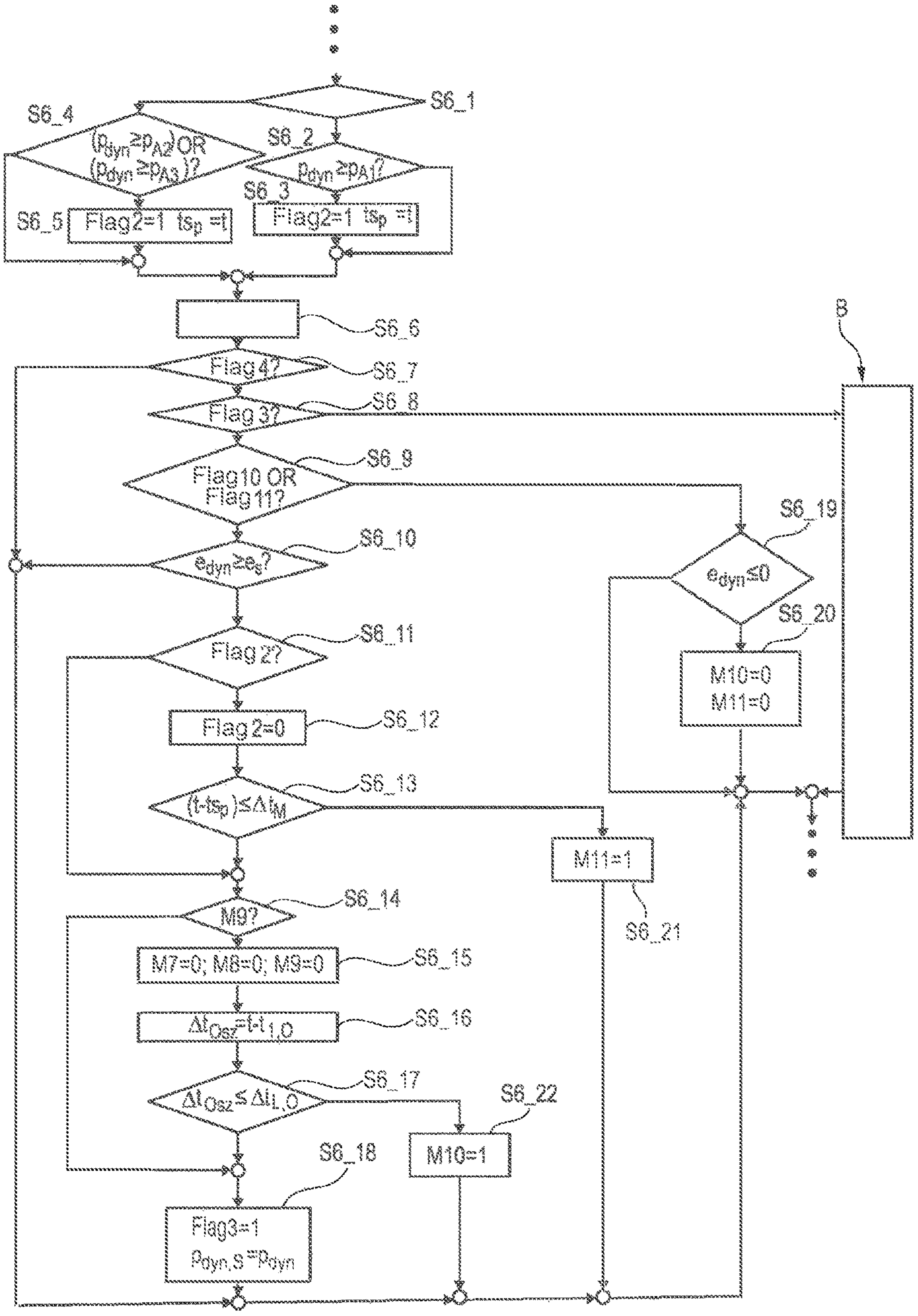
Figure 5B:
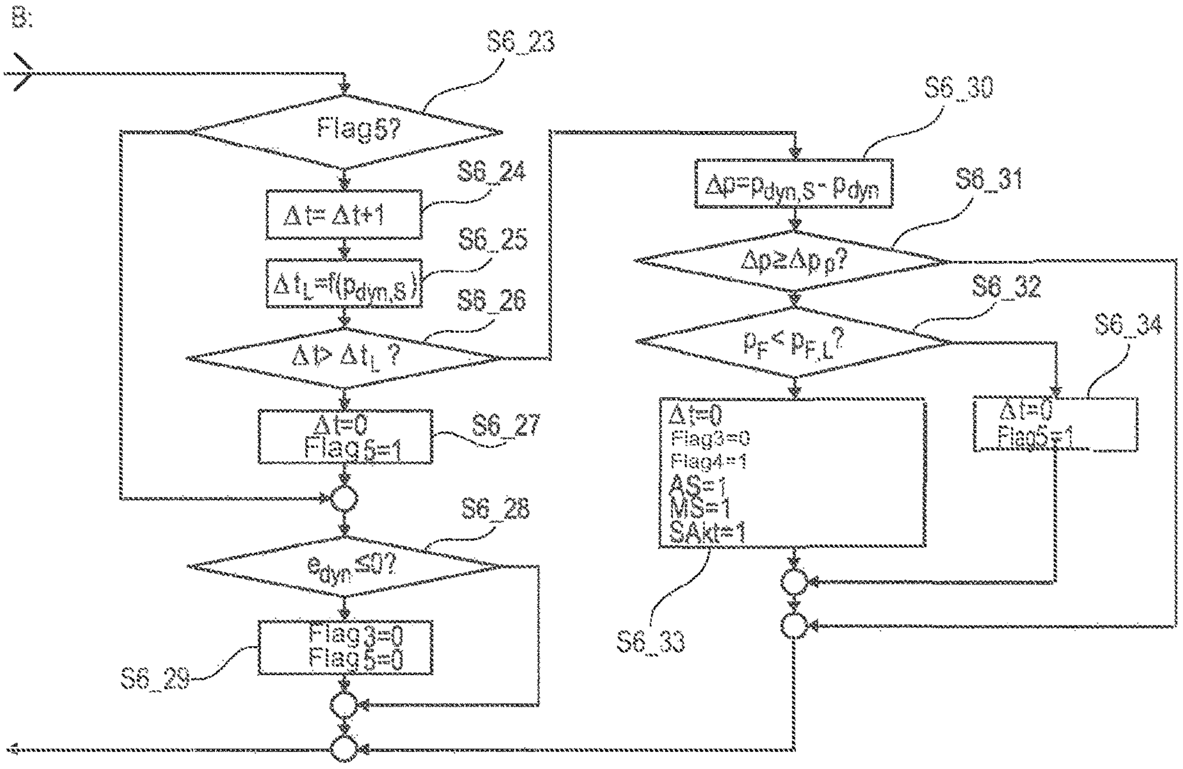
Figure 6:
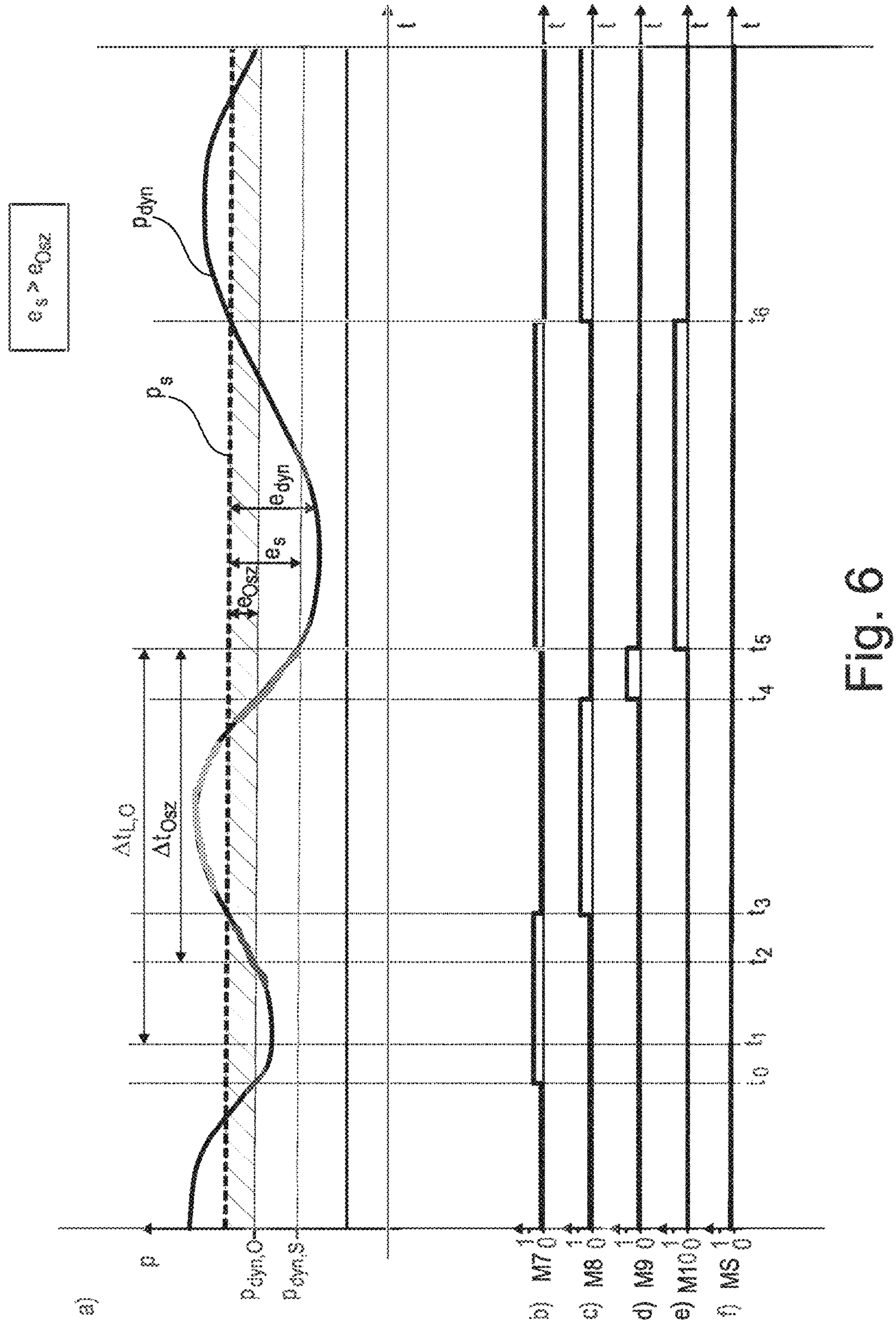
Figure 7:
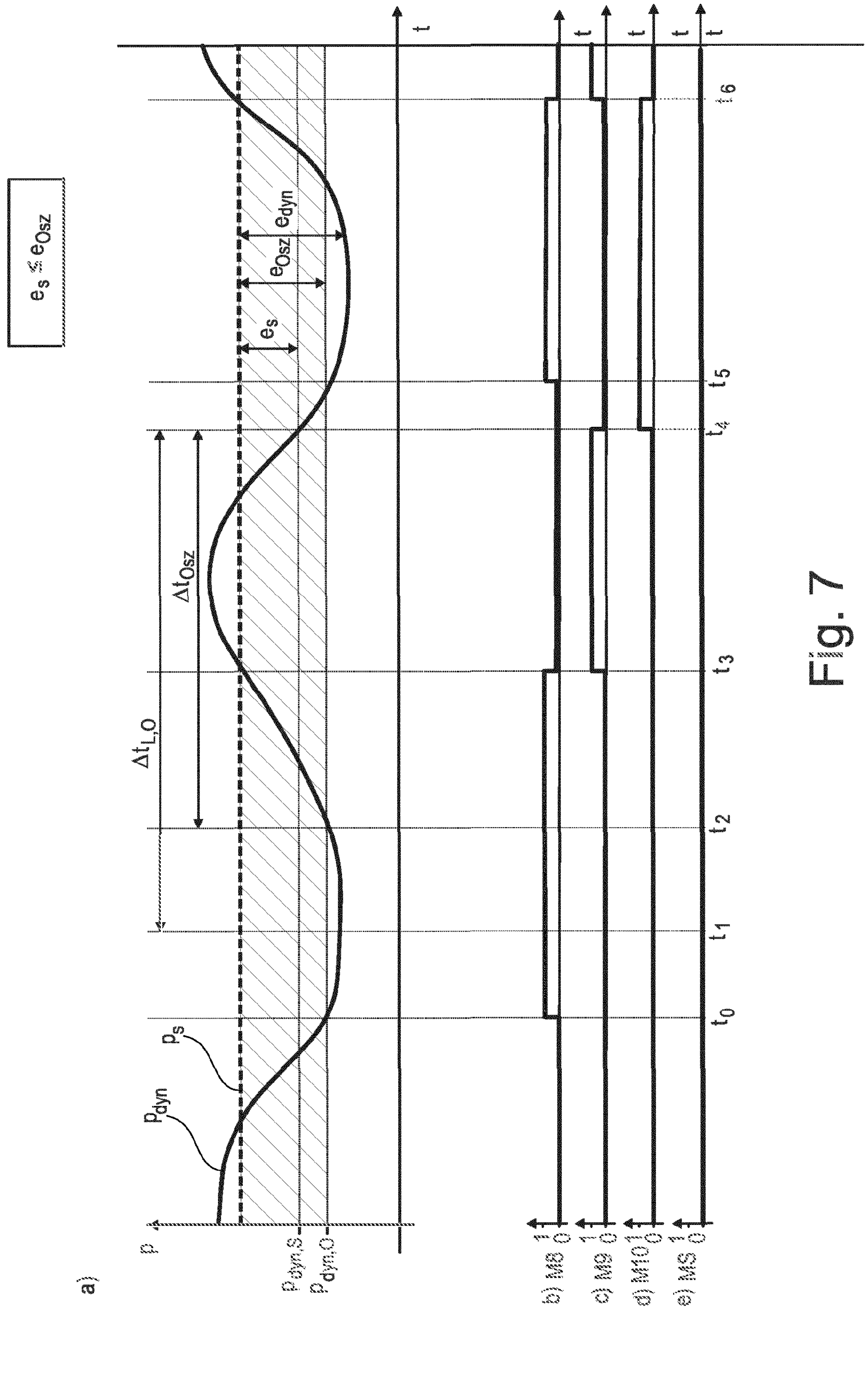
Figure 8:
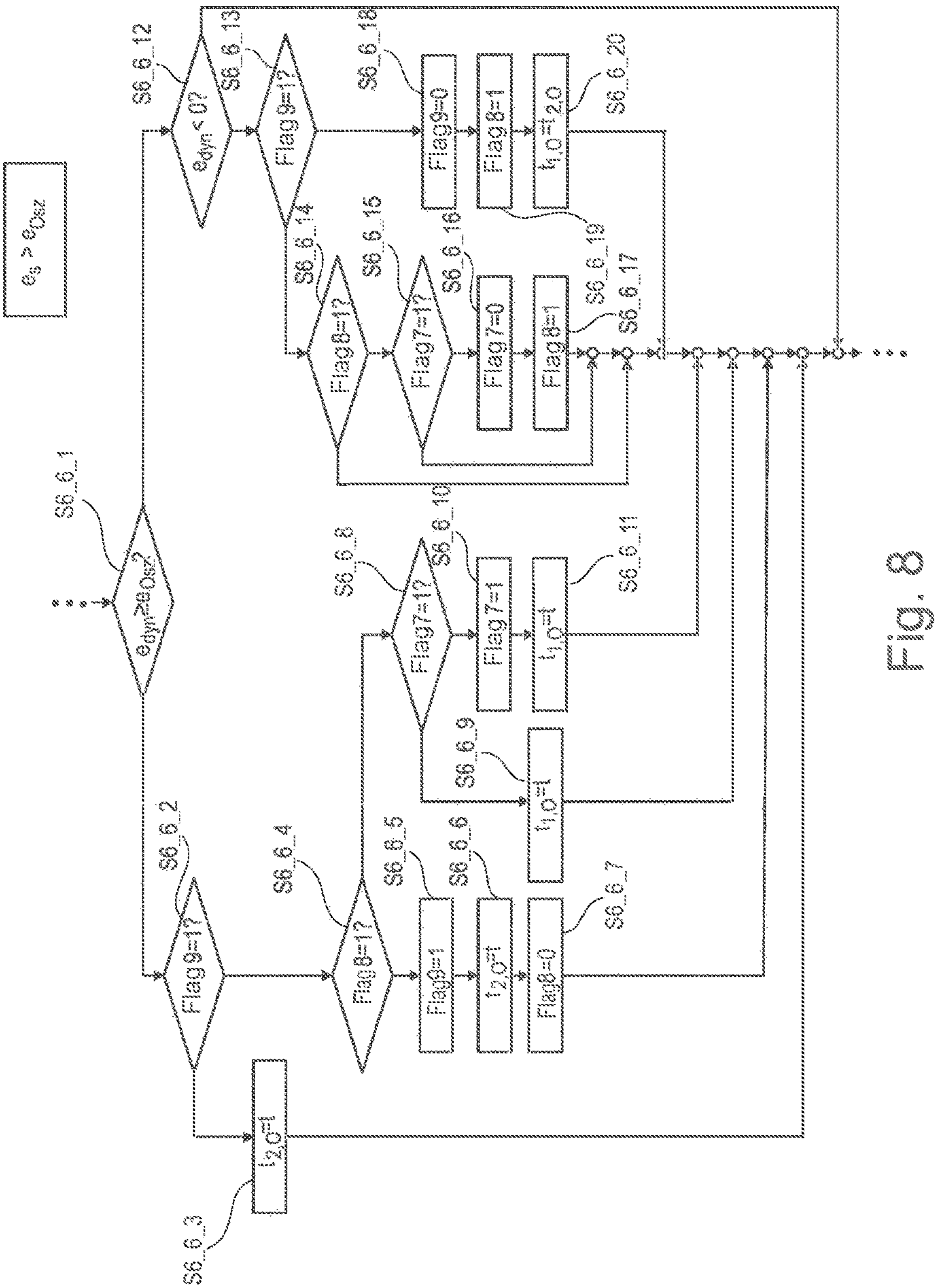
Figure 9:
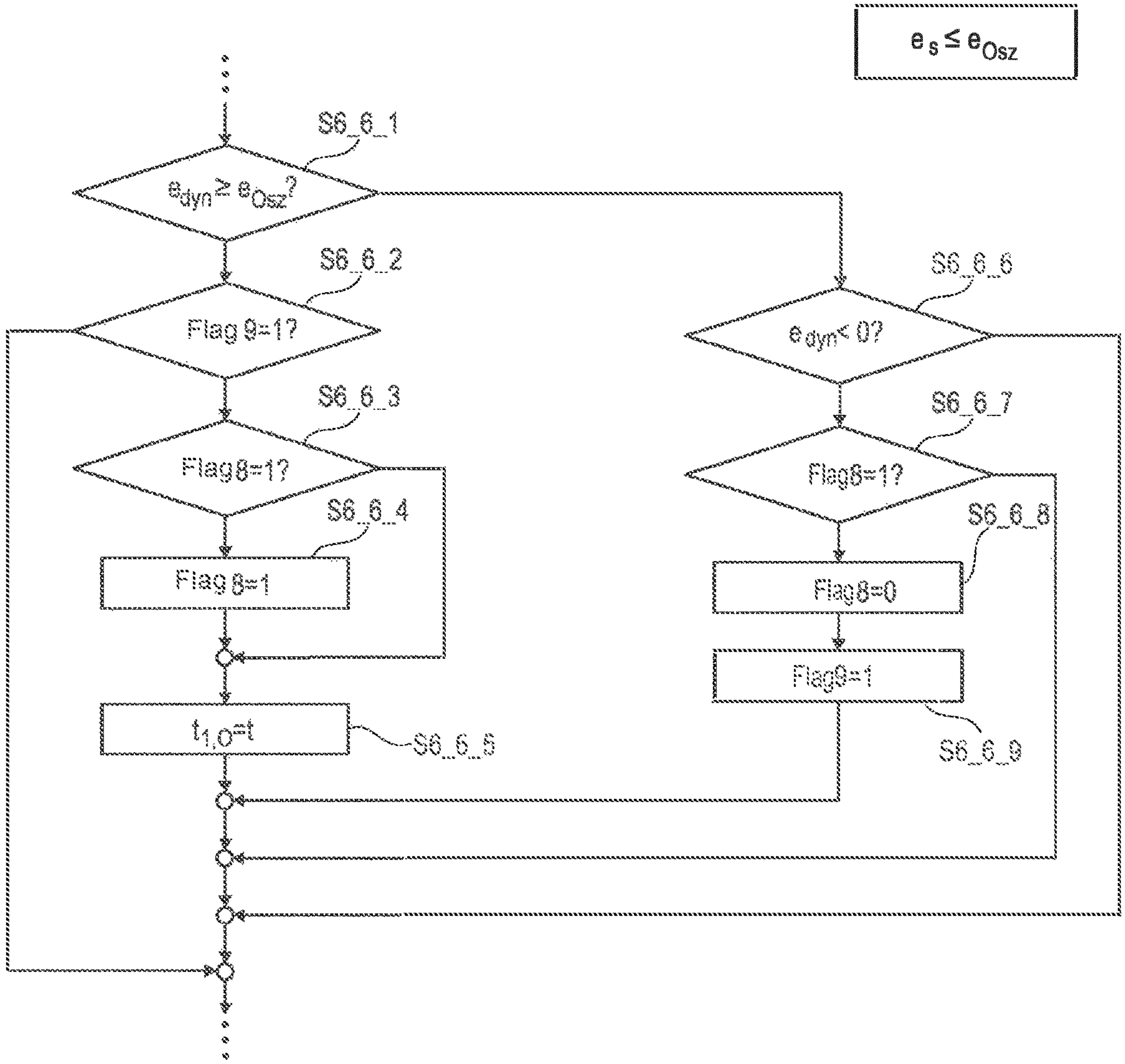

FIG. **5*a* is a schematic detail view of the embodiment of the method according to FIG. 4**;

FIG. **5*b* is a schematic detail view of the embodiment of the method according to FIG. 4**;

FIG. 6 is a diagrammatic view of a first design variant of the embodiment of the method according to FIGS. 4 and 5;

FIG. 7 is a diagrammatic view of a second design variant of the embodiment of the method according to FIGS. 4 and 5;

FIG. 8 is a schematic view in the form of a flow chart of the first design variant according to FIG. 6; and FIG. 9 is a schematic view in the form of a flow chart of the second design variant according to FIG. 7.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
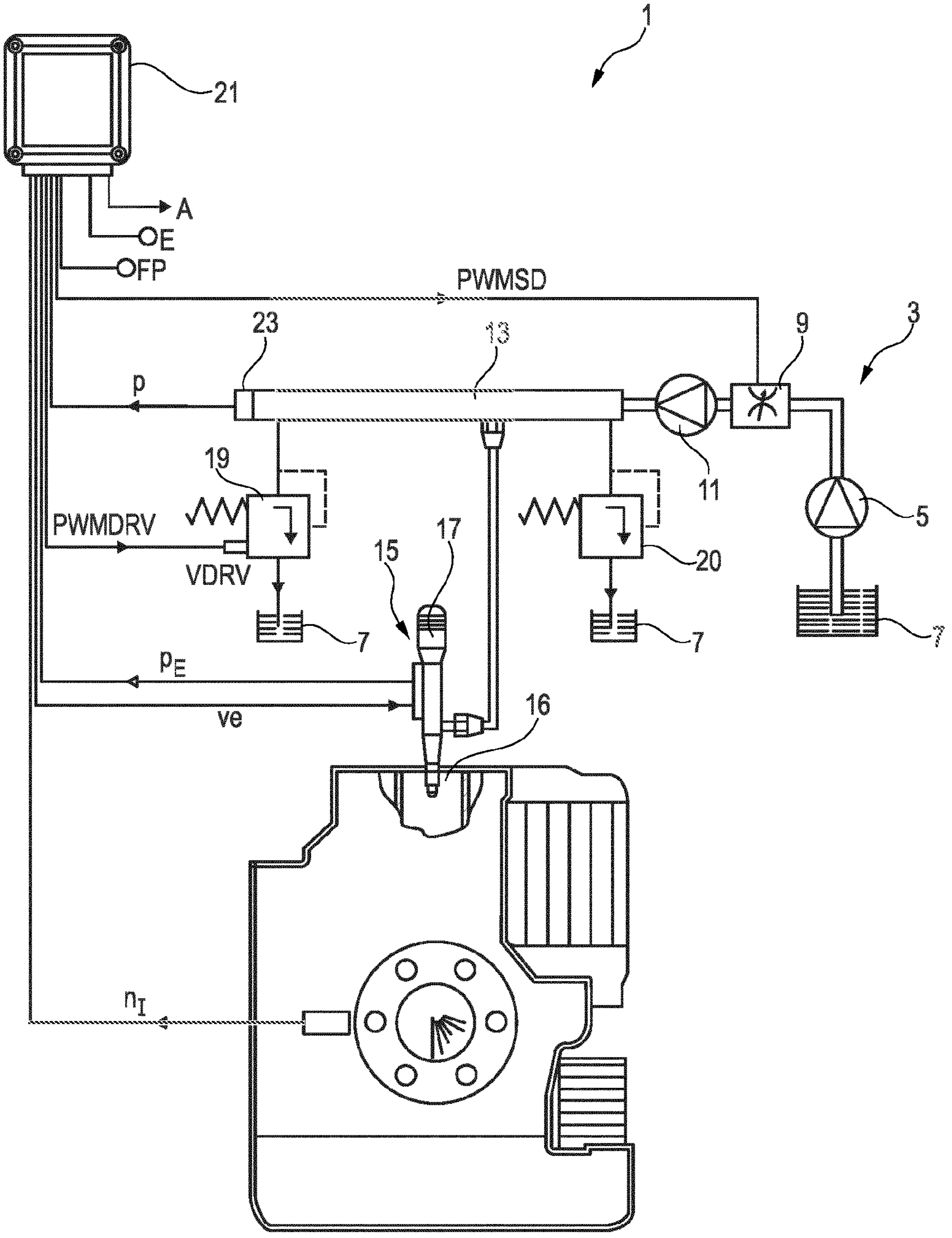
FIG. 1 is a schematic view of a design example of an internal combustion engine.

Referring now to the drawings, and more particularly to FIG. 1, there is shown a schematic view of a design example of an internal combustion engine 1, which includes an injection system 3. Injection system 3 is designed optionally as a common rail injection system. It includes: a low pressure pump 5 to move fuel out of a fuel reservoir 7; an adjustable, low pressure side suction throttle 9 for control of fuel volume flow, flowing to a high pressure pump 11; high pressure pump 11 to move the fuel under increased pressure into a high pressure accumulator 13; high pressure accumulator 13 for storage of the fuel; and optionally a plurality of injectors 15 for injecting fuel into combustion chambers 16 of internal combustion engine 1. As an option it is also possible that injection system 3 is also designed with individual reservoirs, wherein for example an individual reservoir 17 is integrated in injector 15 as an additional buffer volume. In the here illustrated design example an electrically controllable pressure regulating valve 19 is provided, through which high pressure accumulator 13 is fluidically connected with fuel reservoir 7. The setting of pressure control valve 19 defines a fuel volume flow which is moved from high pressure accumulator 13 into fuel reservoir 7. This fuel volume flow is identified with VDRV in FIG. 1 and in the following text.

The here illustrated injection system 3 includes a mechanical pressure relief valve 20 which also connects high pressure accumulator 13 with fuel reservoir 7. Mechanical pressure relief valve 20 actuates, in other words opens, when the high pressure in high pressure accumulator 13 reaches or exceeds a predetermined overpressure relief-pressure value. High pressure accumulator 13 is then pressure-relieved toward fuel reservoir 7, via mechanical pressure relief valve 20. This aids the safety of injection system 3 and avoids impermissibly high pressures in high pressure accumulator 13. In another design example, internal combustion engine 1 may include only one mechanical pressure relief valve, or only one controllable pressure control valve and no mechanical pressure control valve, or a plurality of controllable pressure control valves. In particular, optionally no mechanical pressure relief valve is provided, if internal combustion engine 1 includes a plurality of controllable pressure control valves. In particular, it is then possible that at least one controllable pressure control valve of the plurality of controllable pressure control valves assumes the functionality of the mechanical pressure relief valve.

The operating mode of internal combustion engine 1 is determined by an electronic control unit 21, which is designed optionally as engine control unit of internal combustion engine 1, in particular as a so-called engine control unit (ECU). Electronic control unit 21 includes the usual components of a microcomputer system—for example a microprocessor, I/O modules, buffer, and memory modules (EEPROM, RAM). Operating data which is relevant for the operation of internal combustion engine 1 are stored in the memory modules in characteristics diagrams/characteristics curves. Based on these, electronic control unit 21 calculates output values from input values. The following input values are shown in an exemplary manner in FIG. 1: a measured, still unfiltered high pressure p prevailing in high pressure accumulator 13 and which is measured by means of a high pressure sensor 23; a current engine speed III; a signal FP for the performance specification by an operator of internal combustion engine 1; and an input value E. Under input value E, additional sensor signals are optionally combined, for example a charge air pressure of an exhaust gas turbocharger. In an injection system 3 with individual accumulators 17, an individual accumulator pressure $p_E$ is optionally an additional input value for control unit 21.

Illustrated in FIG. 1 the following examples are shown as output values of electronic control unit 21: a signal PWMSD for actuating suction throttle 9 as a first pressure regulating element; a signal ye for actuating injectors 15—which in particular specifies an injection start and/or an injection end or also an injection duration; a signal PWMDRV for actuating pressure control valve 19 as a second pressure regulating element; and an output value A. Via the optionally pulse-width modulated signal PWMDRV the positioning of pressure control valve 19 and thereby the high pressure disturbance variable VDRV is defined. Output value A is representative for additional control signals for controlling and/or regulating internal combustion engine 1, for example for a control signal to activate a second exhaust gas turbocharger during a register charge.

Figure 2:
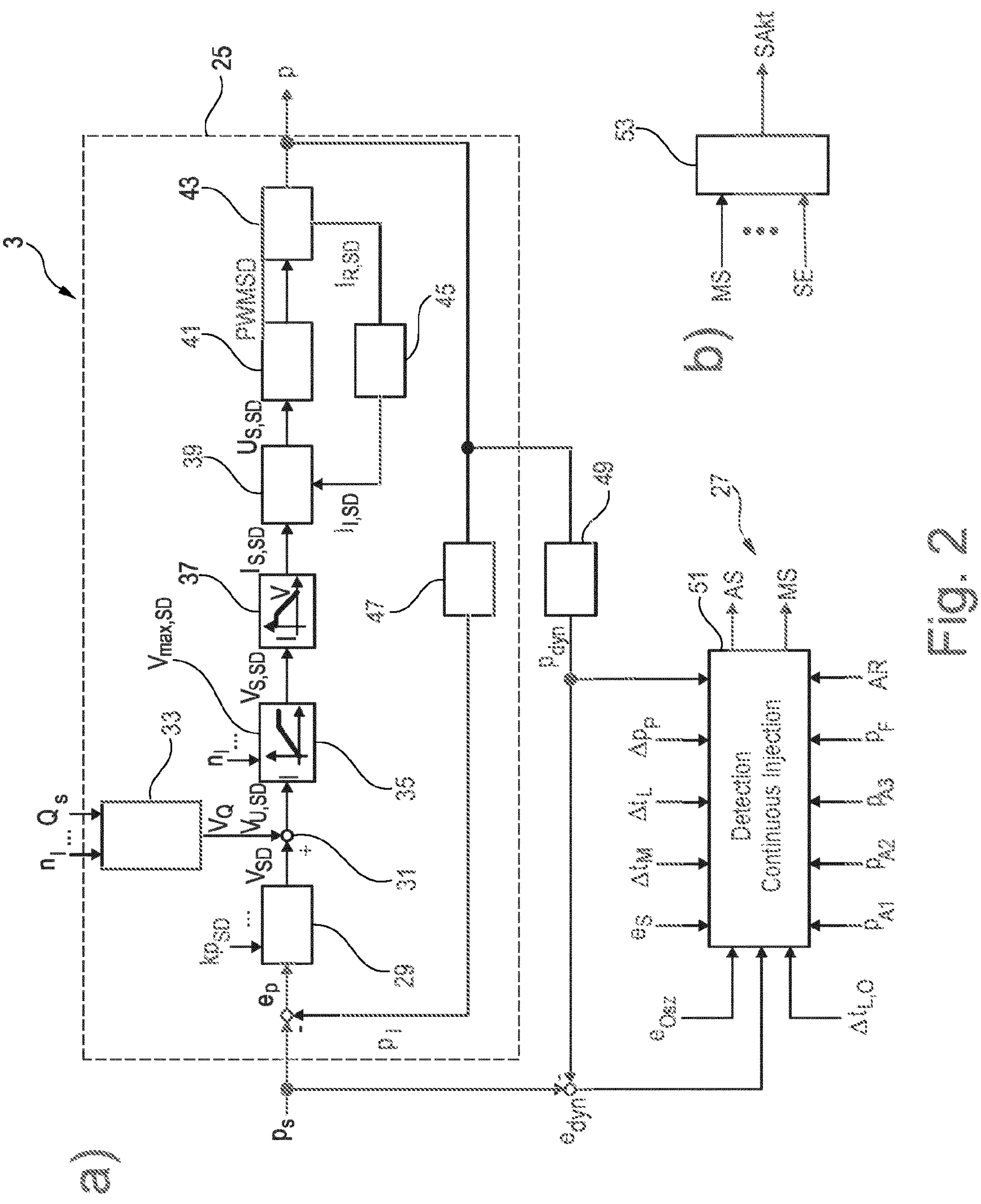
FIG. 2 is a schematic detailed view of a design example of an injection system.

FIG. 2*a*) is schematic detailed view of a design example of an injection system 3. A high pressure control circuit 25 is schematically illustrated inside the area defined by dashed lines, which is arranged to regulate the high pressure in high pressure accumulator 13. Outside high pressure control circuit 25, or respectively outside the area defined by a dashed line, a continuous injection detection function 27 is shown.

The following explains in further detail the operating mode of high pressure control circuit 25. One input value of high pressure control circuit 25 is a high pressure-target value $p_S$ that is determined by control unit 21 and which subsequently is also referred to as target-high pressure $p_S$, which is compared with an actual high pressure $p_I$ for the purpose of calculating a control deviation $e_p$. Control deviation $e_p$ is calculated in particular in such a way that the actual high pressure $p_I$ is deducted from target-high pressure $p_S$, so that the prefix for control deviation $e_p$ is positive when the actual high pressure $p_I$ is lower than the target-high pressure $p_S$. Target high pressure $p_S$ is optionally read from a characteristics diagram, optionally subject to a speed $n_1$ of internal combustion engine 1, a load or torque requirement on internal combustion engine 1, and/or depending on additional values which in particular serve a correction. Additional input values of high pressure control circuit 25 are especially speed $n_I$ of internal combustion engine 1, and a target injection volume $Q_S$. An output value of high pressure control circuit 25 is in particular high pressure p, measured by high pressure sensor 23. As will be explained later, said high pressure p is subjected to a first filtering, wherein the actual high pressure $p_I$ emerges as output value from this first filtering. Control deviation $e_p$ is an input value of a high pressure regulator 29 which is designed optionally as $PI(DT_1)$ algorithm. An additional input value of high pressure regulator 29 is optionally a proportional coefficient $kp_{SD}$. Output value of high pressure regulator 29 is a fuel target volume flow $V_{SD}$ for suction throttle 9 to which at one addition point 31 a fuel target consumption $V_Q$ is added. In a first calculation link 33, this fuel target consumption $V_Q$ is calculated depending on speed $n_I$ and target injection volume $Q_S$ and represents a disturbance value of first high pressure control circuit 25. As the sum of output value $V_{SD}$ of high pressure regulator 29 and disturbance value $V_Q$, an unlimited fuel target volume flow $V_{U,SD}$ results. This is limited in a limiting element 35—depending on speed $n_I$—to a maximum volume flow $V_{max,SD}$ for suction throttle 9. An output value of limiting element 35 is a limited fuel target volume flow $V_{S,SD}$ for suction throttle 9, which is used as an input variable in a pump characteristics curve 37. This converts limited fuel target volume flow $V_{S,SD}$ into a suction throttle target flow $I_{S,SD}$.

Suction throttle target flow $I_{S,SD}$ represents an input value of a suction throttle current regulator 39 which is tasked to regulate the suction throttle current through suction throttle 9. An additional input value of suction throttle current regulator 39 is an actual suction throttle current $I_{L,SD}$. Output value of suction throttle current regulator 39 is a suction throttle target voltage $U_{S,SD}$, which ultimately is converted in a second calculation link 41 in a known manner, into a duty cycle of a pulse-width modulated signal PWMSD for suction throttle 9. With this, suction throttle 9 is actuated, wherein the signal acts collectively on a controlled system 43, which includes in particular suction throttle 9, high pressure pump 11 and high pressure accumulator 13. The suction throttle current is measured, wherein a raw measured value $I_{R,SD}$ results which is filtered in a current filter 45. Current filter 45 is designed optionally as a $PT_1$-filter. Output value of current filter 45 is the actual suction throttle current $I_{L,SD}$, which in turn is again fed to suction throttle current regulator 39.

The control variable of first high pressure control circuit 25 is the high pressure in high pressure accumulator 13. Raw values of said high pressure p are measured by high pressure sensor 23 and filtered by a first high pressure filter element 47, which has the actual high pressure $p_I$ as the output value. First high pressure filter element 47 is optionally implemented by a $PT_1$-algorithm.

Below, the functionality of continuous injection detection 27 is explained in further detail. The raw values of high pressure p are filtered by a second high pressure filter element 49, the output value of which is dynamic rail pressure $p_{dyn}$. Second high pressure filter element 49 is optionally implemented by a $PT_1$-algorithm. A time constant of first high pressure filter element 47 is optionally greater than a time constant of second high pressure filter element 49. In particular, second high pressure filter element 49 is a faster filter than first high pressure filter element 47. The time constant of second high pressure filter element 49 can be identical with a zero value, so that then dynamic rail pressure $p_{dyn}$ corresponds to the measured raw values of high pressure p or is identical to them. With dynamic rail pressure $p_{dyn}$, a hydrodynamic value exists for the high pressure, which is advantageous in particular, if a faster reaction to certain occurring events is required.

A difference of target high pressure $p_S$ and dynamic rail pressure $p_{dyn}$ results in a dynamic high pressure control deviation $e_{dyn}$. It also applies in this case, that for the calculation of dynamic high pressure control deviation $e_{dyn}$, the dynamic rail pressure $p_{dyn}$ is deducted from target high pressure $p_S$, so that the prefix for the dynamic high pressure control deviation $e_{dyn}$ is positive when the dynamic rail pressure $p_{dyn}$ is lower than the target-high pressure $p_S$. The dynamic high pressure control deviation $e_{dyn}$ is an input variable of a function block 51 for detection of a continuous injection. Additional—in particular parameterizable—input values for function block 51 are: various limiting pressure amounts, in this case specifically a first overpressure relief-pressure value $p_{A1}$, at which or above which its mechanical pressure relief valve responds; a control relief-pressure value $p_{A2}$ at which or above controllable pressure control valve 19 is actuated to control the high pressure, as the only pressure regulating element, for example if suction throttle 9 fails; and a second overpressure relief-pressure value $p_{A3}$, at which or above which controllable pressure regulating valve 19 is actuated to open—optionally completely, in order to assume a safety function for injection system 3 and thus to quasi replace or supplement mechanical pressure relief valve 20. Additional—in particular parameterizable—input values are: a predetermined starting-differential pressure value $e_S$; a predetermined check-time interval $\Delta t_M$; predetermined continuous injection time interval $\Delta t_1$; predetermined continuous injection differential pressure amount $\Delta p_P$; fuel pre-pressure $p_F$; dynamic rail pressure $p_{dyn}$; and an alarm reset signal AR. Output values of functions block 51 are an engine stop signal MS and an alarm signal AS. According to the herein disclosed teaching, an oscillation time interval $\Delta t_{L,O}$ and an oscillation differential pressure amount $e_{Osz}$ are added as additional input values of function block 51.

FIG. 2*b*) shows that the engine stop signal MS triggers an engine stop when it assumes the—in other words is set to—value of 1, wherein in this case also a logic signal SAkt is set, causing a stop of internal combustion engine 1. Actuation of an engine stop can also have other causes, for example setting of an external engine stop. Herein, an external stop signal SE becomes identical with value 1 and—since all possible stop signals are connected with one another through a logical OR-linkage 53—the resulting logic signal SAkt is also identical with value 1.

Figure 3:
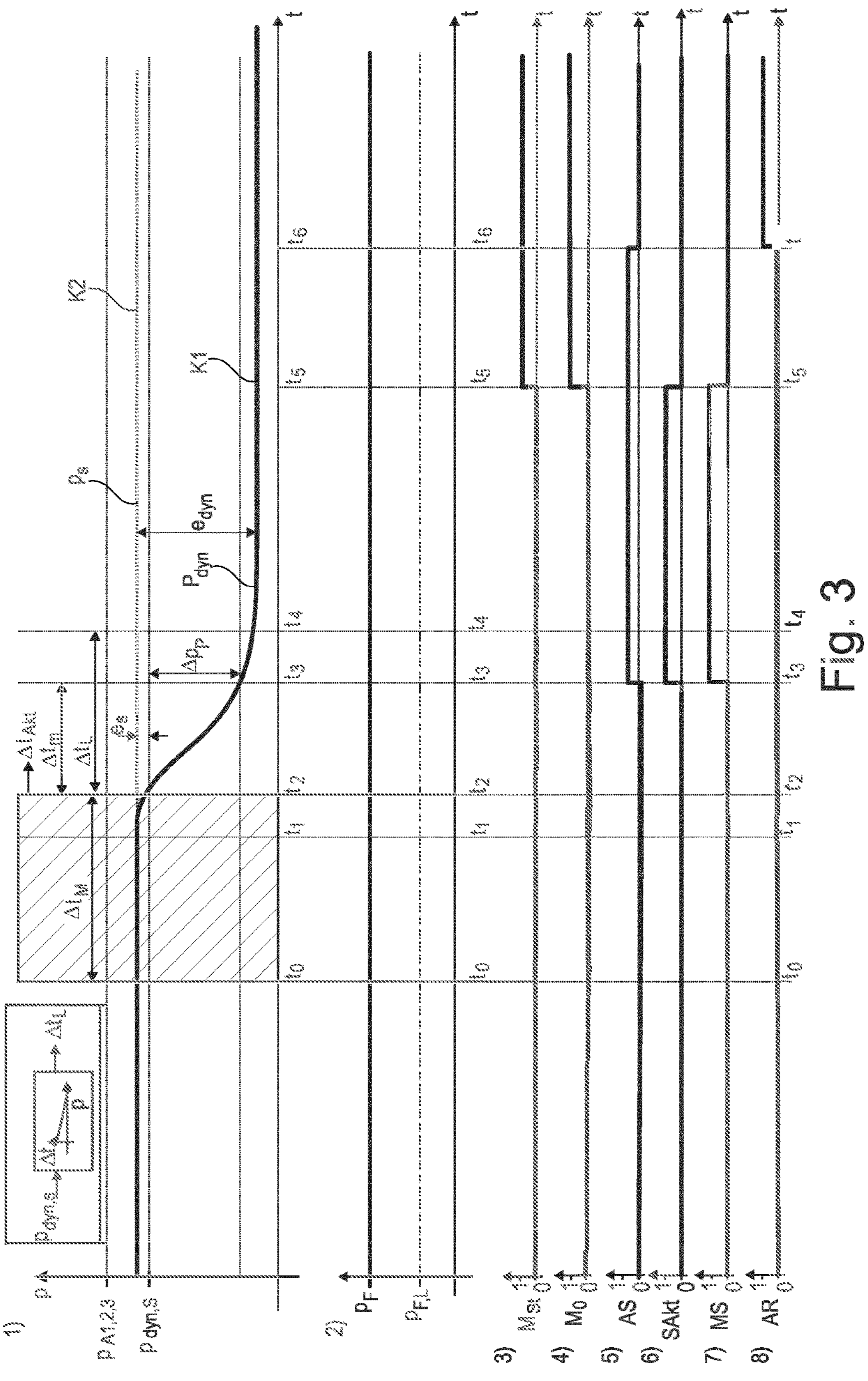
FIG. 3 is a schematic view of a method for detection of continuous injection, shown in a diagrammatic view.

FIG. 3) is a schematic view of a method for detection of continuous injection, shown diagrammatically, in particular depicted as various time diagrams below one another. The time diagrams are identified—from the top down—as first diagram, second diagram, and so on. In particular, the first diagram in FIG. 3 is thus the top diagram, followed by the subsequentially numbered diagrams.

The first diagram illustrates the temporal progression—subject to a time parameter t—of dynamic rail pressure $p_{dyn}$ as a solid curve K1, and the temporal progression of dynamic rail pressure $p_{dyn}$ as dotted line K2. Up to a first time point $t_1$ both curves K1, K2 progress identically. After first time point $t_1$, dynamic rail pressure $p_{dyn}$ becomes lower, whereas target high pressure $p_S$ remains constant. This results in a positive dynamic high pressure control deviation $e_{dyn}$, which becomes identical at a second time point $t_2$ with the predetermined starting-differential pressure amount $e_S$. At this point in time a time counter $\Delta t_{Akt}$ starts up. At the second time point $t_2$, the dynamic rail pressure $p_{dyn}$ is identical with a starting high pressure $p_{dyn,S}$. At a third time point $t_3$, dynamic rail pressure $p_{dyn}$ originating from the starting high pressure $p_{dyn,S}$ has dropped by the predetermined continuous injection differential pressure amount $\Delta p_P$. A typical value for $\Delta p_P$ is optionally 400 bar. At the third time point $t_3$, time counter $\Delta t_{Akt}$ assumes the following value:

$$\Delta t_{Akt}=\Delta t_m=t_3-t_2.$$

Continuous injection is detected when the measured time period $\Delta t_m$,—in other words, the time period during which the dynamic rail pressure $p_{dyn}$ drops by the predetermined continuous injection differential pressure amount $\Delta p_P$—is shorter or the same as the predetermined continuous injection time interval $\Delta t_L$.

$$\Delta t_m \leq \Delta t_L.$$

The predetermined continuous injection time interval $\Delta t_L$ is herein calculated optionally over a two-dimensional curve, in particular a characteristics curve from the starting high pressure $p_{dyn,S}$. The following applies herein: the lower the starting high pressure $p_{dyn,S}$ is, the greater is the predetermined continuous injection time interval $\Delta t_L$. Typical values for the predetermined continuous injection time interval $\Delta t_L$, depending on the starting high pressure $p_{dyn,S}$, are listed in the following chart:

| $p_{dyn,S}$ [bar] | $\Delta t_L$ [ms] |
|---|---|
| 600 | 150 |
| 800 | 135 |
| 1000 | 120 |
| 1200 | 105 |
| 1400 | 90 |
| 1600 | 75 |
| 1800 | 60 |
| 2000 | 55 |
| 2200 | 40 |

In order to rule out that the drop of the high pressure is caused by the actuation of a pressure limiting valve, a check is conducted within the scope of the method, as to whether the high pressure during the predetermined check-time interval $\Delta t_M$ has reached or exceeded at least one of the predetermined limiting pressure amounts, in particular the first overpressure relief-pressure value $p_{A1}$, the control relief-pressure value $p_{A2}$, and/or the second overpressure relief-pressure value $p_{A3}$.

If this is the case, in other words, if a pressure limiting valve has responded in the predetermined check-time interval $\Delta t_M$, then no continuous injection is performed, and thus no continuous injection is detected. A optional value for the check-time interval $\Delta t_M$ is a value of 2 s.

If no pressure limiting valve has responded within the predetermined check-time interval and if the high pressure at the third time point $t_3$ has dropped within the predetermined continuous injection time interval $\Delta t_L$ by at least the predetermined continuous injection differential pressure amount $\Delta p_P$, a check is conducted as to whether the fuel pre-pressure $p_F$ is greater than or the same as a predetermined pre-pressure limit value $p_{F,L}$. If this is the case, as illustrated in the second diagram, a continuous injection is detected. If this is not the case it is assumed that the fuel pre-pressure could be responsible for the drop in high pressure, and no continuous injection is detected.

A optional prerequisite to carry out the continuous injection check is also that internal combustion engine 1 is beyond the starting phase. This is the case when internal combustion engine 1 has reached a predetermined idle speed for the first time. A binary engine control signal $M_{St}$ that is illustrated in the third diagram then assumes the logic value of 0. If a stop of internal combustion engine 1 is detected, this signal is set to logic value 1.

An additional prerequisite to perform a continuous injection check is optionally that dynamic rail pressure $p_{dyn}$ has reached target high pressure $p_S$ for the first time.

If continuous injection is detected at the third time point $t_3$, alarm signal AS is set which—in the fifth diagram—changes from logic value 0 to logic value 1. If continuous injection is detected, shut down of internal combustion engine must occur simultaneously. Accordingly, the engine stop signal MS, which indicates that an engine stop is initiated as a consequence of detection of a continuous injection, must be set from logic value 0 to logic value 1, which is shown in the seventh diagram. The same applies for signal SAkt effecting a stop of internal combustion engine 1, which ultimately leads to shutdown of internal combustion engine 1, which is shown in particular in the sixth diagram.

A standstill of internal combustion engine 1 is detected at a fifth time point $t_5$, so that a stationary signal Mo which indicates that internal combustion engine 1 is stationary, changes from logic value 0 to logic value 1. At the same time, the value of engine starting signal $M_{St}$ shown in the third diagram which indicates the starting phase of internal combustion engine 1, changes from logic value 0 to logic value 1, because internal combustion engine 1 is again in the starting phase following the detected standstill. If internal combustion engine 1 is detected as being in the standstill position, both signals SAkt and MS are again set to logic value 0, which is again illustrated in the fifth diagram.

At a sixth time point $t_6$ an alarm reset button is pressed by an operator of internal combustion engine 1, so that the alarm-reset signal AR, as shown in the eighth diagram changes from logic value 0 to logic value 1. This in turn results in that alarm signal AS which is illustrated in the fifth diagram is reset to logic value 0.

If a continuous injection is detected or if no continuous injection is detected prior to the sequence of the predetermined continuous injection time interval $A_{tL}$, a new continuous injection check can subsequently only be conducted if dynamic rail pressure $p_{dyn}$ has again reached or exceeded target high pressure $p_S$:

$$p_{dyn} \geq p_S.$$

FIG. 4 is a schematic illustration in the form of a flow chart, of one embodiment of a method for operating internal combustion engine 1. The process starts in a starting step S0. In a first step S1 the dynamic high pressure control deviation $e_{dyn}$ is calculated as a difference between target high pressure $p_S$ and dynamic rail pressure $p_{dyn}$. In a second step S2 it is queried whether a logic variable that is identified as flag1 is set.

In the following, the term "flag" describes a logic or binary variable which can assume two states, in particular 0 and 1. A flag being set, here and in the following, means that the corresponding logic variable shows a first of the two states, in particular an active state, for example value 1. A flag not being set, here and in the following, means that the logic variable shows the other, second state, in particular an inactive state, for example value 0.

In the current embodiment of the process, logic variable flag1 monitors whether internal combustion engine 1 is in its starting phase, and whether the high pressure has reached or exceeded target high pressure $p_S$ for the first time. Flag1 is herein set, when internal combustion engine 1 is no longer in the starting phase and when dynamic rail pressure $p_{dyn}$ has reached or exceeded target high pressure $p_S$ for the first time. If one of these conditions is not met, flag1 will not be set.

If flag1 is set the sequence continues in a sixth step S6 with a continuous injection check-algorithm which is illustrated in FIG. 5.

If flag1 is not set, the sequence continues with a third step S3. In third step S3 it is queried whether internal combustion engine 1 has left the starting phase. If this is not the case, the process continues in a seventh step S7. If this is however the case, a check is conducted in fourth step S4, whether the dynamic rail pressure control deviation $e_{dyn}$ is less than or equal to 0. If this is not the case—which means that dynamic rail pressure $p_{dyn}$ has not yet reached or exceeded target high pressure $p_S$—the process continues in seventh step S7. If, in contrast the dynamic rail pressure control deviation $e_{dyn}$ is less than or equal to 0, flag1 is set in a fifth step S5.

In seventh step S7 it is queried whether internal combustion engine 1 is stationary. If this is not the case the sequence continues in a tenth step S10. If internal combustion engine 1 is stationary, flag1 as well as additional logic variables—flag2, flag3, flag4 and flag5—are reset.

As will be explained in further detail, flag2 indicates whether a pressure limiting valve has been responded; flag3 indicates whether the continuous injection detection is to be performed; flag4 indicates that a continuous injection has been detected and disables subsequent implementations of continuous injection detection, in particular until standstill and restart of internal combustion engine 1; and flag5 ultimately indicates that continuous injection has in fact occurred that, however, no continuous injection has been detected, wherein it in particular disables renewed implementation of continuous injection detection until dynamic pressure $p_{dyn}$ has again reached or exceeded target high pressure $p_S$.

In a ninth step S9, logic engine stop signal MS, which triggers a stop of internal combustion engine 1 due to a detected continuous injection, as well as logic signal ASkt, which effects a stop of internal combustion engine 1, are reset. In a tenth step S10 it is checked whether alarm reset signal AR as well as logic standstill signal Mo which indicates a standstill of the internal combustion engine and alarm signal AS which indicates a detected continuous injection are set. If at least one of these logic signals is not set, the process ends in a twelfth step S12. If, in contrast all of these logic signals are set, alarm signal AS is reset in an eleventh step S11.

The process is optionally carried out repetitively. This means in particular, that after its conclusion in step S12, it starts again—optionally immediately—in starting step S0. It is optional if the repetitive implementation of the process ends with completely switching off of control unit 21 which is optionally arranged to carry out the process. The process then starts again optionally after a restart of control unit 21 with starting step S0.

FIG. 5 (shown as FIG. 5*a* and FIG. 5*b*) is a schematic detail view of the embodiment of the process according to FIG. 4. FIG. 5 shows in particular a detailed view of sixth step S6 according to the flow chart in FIG. 4, again in the form of a flow chart. In the following, the process steps carried out within step 6 are thereby identified as sub-steps. In particular in FIG. 4 the logic variables starting with the word "Flag" are abbreviated for reasons of legibility with "MX" wherein M designates "Flag", and X is the respective code for the corresponding variable; flag9 is thus abbreviated as M9.

According to FIG. 5 a) it is queried in a first sub-step S6_1 whether a mechanical pressure relief valve 20 is present. This query is not mandatory. It is also possible that the process sequence is customized and adapted to the specific configuration of combustion engine 1, wherein it is firmly implemented in the process sequence whether a mechanical pressure relief valve 20 is present or not. In this case, the branching illustrated in first sub-step S6_1 does not have to be provided, rather, the process step suitable for the configuration of internal combustion engine 1 can interphase directly. The herein described embodiment of the method does however have the advantage that it can be utilized independently from the specific configuration of internal combustion engine 1, so that it can be used very flexibly and is quickly implementable in the sense of a retrofit solution into an existing control unit 21 of an internal combustion engine 1. By means of the query in first sub-step S6_1, the process then receives the necessary information for further advance in regard to the presence of a mechanical pressure relief valve 20.

If a mechanical pressure relief valve 20 is present in internal combustion engine 1 it is queried in a second sub-step S6_2 whether dynamic rail pressure $p_{dyn}$ is greater or the same as first overpressure relief-pressure value $p_{A1}$. If this is not the case the sequence continues with a sixth sub-step S6_6. If, in contrast it is the case, flag 2 is set in a third sub-step S6_3. A time variable $t_{Sp}$ is simultaneously set to a current system time t. The sequence subsequently continues with the sixth sub-step S6_6. If no mechanical pressure relief valve 20 is present, branching occurs from first sub-step S6_1 to a fourth sub-step S6_4. In fourth sub-step S6_4 it is queried whether dynamic rail pressure $p_{dyn}$ is greater than or the same as control relief-pressure value $p_{A2}$ or greater than or the same as the second overpressure relief-pressure value $p_{A3}$. If this is not the case, the sequence continues in sixth sub-step S6_6. It this is the case, flag2 is set in a fifth sub-step S6_5. Time variable $t_{Sp}$ is simultaneously set to the current system time 1. The sequence subsequently continues with sixth sub-step S6_6.

In the latter, the value of an additional logic variable flag9 is calculated, wherein flag9 indicates whether a fluctuation in the high pressure which is possibly to be qualified as a high pressure oscillation within an oscillation time interval has been detected and, which is then subsequently verified. Two design variants for calculating logic variable flag9 are explained in further detail below, with reference to FIGS. 8 and 9. It is to be noted that flag9 assumes value 1 if a corresponding fluctuation in high pressure has been detected, whereby flag9 assumes value 0 if no such high pressure fluctuation is detected.

After conducting this check regarding a pertinent high pressure fluctuation by calculating logic variable flag9, the process is continued in a seventh sub-step S6_7.

Here, flag4 is queried. If the latter is set, seventh step S7 continues according to FIG. 4.

If flag4 is not set, it is queried in an eighth sub-step S6_8 whether flag3 is set. If flag3 is set the process is continued in a twenty-third sub-step S6_23, as illustrated in block B of FIG. 5*b*), as discussed in further detail below in connection with FIG. 5*b*).

If, in contrast, flag3 is not set, a check is conducted in a ninth sub-step S6_9, whether a logic variable, selected from a logic variable flag10 and a logic variable flag11 is set, that is, whether flag10 and/or flag11 is/are set.

Logic variable flag10 indicates whether a high pressure oscillation has been detected within the oscillation time interval before the starting time. As shown below, in this case a value 1 is allocated to logic variable flag10. If, on the other hand, no such high pressure oscillation was detected, logic variable flag10 indicates value 0. Logic variable flag11 indicates whether the pressure limiting valve has responded within the check-time interval. If this is the case, value 1 is assigned to flag11, otherwise value 0 is assigned to flag11. If now at least one of the variables flag10 or flag11 indicate value 1, the process continues in a nineteenth sub-step S6_19, where a check is conducted as to whether dynamic rail pressure control deviation $e_{dyn}$ is less than or equal to 0, consequently whether dynamic rail pressure $p_{dyn}$ has reached or exceeded target high pressure $p_S$. If this is not the case, the process is continued in seventh step S7 according to FIG. 4. If, on the other hand, this is the case, variables flag10 and flag11 are set to 0 in a twentieth sub-step S6_20. Consequently, continuous injection detection is disabled, as long as one of logic variables flag10 and flag11 indicate value 1 and dynamic rail pressure $p_{dyn}$ has not yet again reached or exceeded target high pressure $p_S$. The process is also continued after twentieth sub-step S6_20 in seventh step S7 according to FIG. 4.

If, on the other hand it is detected in the nineth sub-step S6_9 that neither of the variables flag10 and flag11 indicate value 1, a check is conducted in a tenth sub-step S6_10 whether dynamic rail pressure control deviation $e_{dyn}$ is greater than or the same as starting differential pressure amount $e_S$. If this is not the case, the process continues in a seventh step S7 according to FIG. 4. If, on the other hand this is the case, a check is conducted in an eleventh sub-step S6_11 whether flag2 is set. If flag2 is not set the process continues in a fourteenth sub-step S6_14. If, on the other hand flag2 is set, flag2 is set to 0 in a twelfth sub-step S6_12, and a check is conducted in a thirteenth sub-step S6_13, whether the difference between the current system time t and the value of time variable $t_{Sp}$ is less than or equal to the check-time interval $\Delta t_M$. If this is the case, flag11 is set to 1 in a twenty-first sub-step S6_21, and the process is subsequently continued with seventh step S7 according to FIG. 4. If however, the result of the check in thirteenth sub-step S6_13 is negative, the process continues in fourteenth sub-step S6_14.

Here it is now checked whether flag9 is set. If this is not the case the process is continued in an eighteenth sub-step S6_18, where flag3 is set, so that in the next process cycle in the branching of eighth sub-step S6_8 a branching into block B can occur and the continuous injection detection is performed. Simultaneously, the value of the current dynamic rail pressure $p_{dyn}$ is allocated to starting high pressure $p_{dyn,S}$. The process is subsequently continued with seventh step S7 according to FIG. 4.

If, on the other hand it is detected in fourteenth sub-step S6_14 that flag9 is set, logic variables flag7, flag8 and flag9 are set to 0 in a fifteenth sub-step S6_15.

Subsequently, a time difference $\Delta t_{Osz}$ is calculated in a sixteenth sub-step S6_16 as a difference between the current system time t and a time variable $t_{1,O}$:

$$\Delta t_{Osz}=t-t_{1,O}.$$

Subsequently, it is checked in a seventeenth sub-step S6_17 whether time difference $\Delta t_{Osz}$ calculated in previous step S6_16 is less than or the same as oscillation time interval $\Delta t_{L,O}$. If this is the case, a high pressure oscillation was detected within oscillation time interval $\Delta t_{L,O}$ and flag10 is set accordingly in a twenty-second sub-step S6_22, so that subsequently the continuous injection detection cannot be carried out and is, in particular, disabled until dynamic rail pressure $p_{dyn}$ has again reached or exceeded target high pressure $p_S$. If, on the other hand the result of the query in seventeenth sub-step S6_17 is negative, the process is again continued in the already explained eighteenth sub-step S6_18 with the consequence that in the next program cycle continuous injection detection according to block B is started.

Continuous injection detection according to block B is explained below in further detail with reference to FIG. 5*b*).

Flag5 is queried in twenty-third sub-step S6_23. If flag5 is set, the program is continued with a twenty-eight sub-step S6_28. If flag5 is not set, a time difference variable Δt is incremented in a twenty-fourth sub-step S6_24. Subsequently, in a twenty-fifth sub-step S6_25 the predetermined continuous injection time interval $\Delta t_L$ is calculated as the output value of a two-dimensional curve. Input value of said curve is the starting high pressure $p_{dyn,S}$.

In a twenty-sixth sub-step S6_26 it is queried whether time difference variable Δt is greater than continuous injection time interval $\Delta t_L$. If this is not the case, the program continues in a thirtieth sub-step S6_30. If this is the case, time difference variable Δt is set to value 0 in the twenty-seventh sub-step S6_27, and flag5 is set. Subsequently it is queried in twenty-eighth sub-step S6_28 whether dynamic rail pressure control deviation $e_{dyn}$ is less than or equal to zero. If this is not the case the program continues in seventh step S7 according to FIG. 4. If, on the other hand this is the case, flag3 and flag5 respectively are reset in a twenty-ninth sub-step S6_29. Subsequently the program is continued with seventh step S7 according to FIG. 4.

In thirtieth sub-step S6_30 a differential pressure amount Δp is calculated as the difference between starting high pressure $p_{dyn,S}$ and dynamic rail pressure $p_{dyn}$.

Subsequently it is checked in a thirty-first sub-step S6_31 whether differential pressure amount Δp is greater than or equal to the predetermined continuous injection differential pressure amount $\Delta p_P$. If this is not the case, the program continues in seventh step S7 according to FIG. 4. If, on the other hand this is the case, it is checked in a thirty-second sub-step S6_32 whether the fuel pre-pressure $p_F$ is less than the pre-pressure limit value $p_{F,L}$. If this is the case, time differential variable Δt is set to value 0 in a thirty-fourth sub-step S6_34, and flag5 is set. Subsequently, the program continues in seventh step S7 according to FIG. 4. If the fuel pre-pressure $p_F$ is not less than the predetermined pre-pressure limit value $p_{F,L}$, time differential variable Δt is set to value 0 in a thirty-third sub-step S6_33, and flag3 is reset. Flag4 and alarm signal AS, engine stop signal MS and logic signal Sakt which causes an engine stop are set simultaneously. Subsequently, the program continues in seventh step S7 according to FIG. 4.

Logic variables flag7, flag8 and flag9 are initialized with value 0 at the beginning of the process.

FIG. 6 shows a diagrammatic illustration of a first design variant of the embodiment of the process according to FIGS. 4 and 5. This design variant makes reference to that oscillation limit value $p_{dyn,O}$ is greater than starting high pressure $p_{dyn,S}$ which accordingly means that an oscillation differential pressure amount $e_{Osz}$ which is defined as the difference between high pressure target value $p_S$ or respectively target high pressure $p_S$ and oscillation limit value $p_{dyn,O}$ is less than the starting differential pressure amount $e_S$.

Implementation of the herein disclosed method includes optionally the herein described first design variation as well as the second design variation described below. It performs in particular the calculation of flag9 in sixth sub-step S6_6 according to FIG. 5 subject to the applicable design variation; this means in particular either—as described further below—according to FIG. 8 or according to FIG. 9, in particular depending on the specifically specified values for starting high pressure $p_{dyn,S}$ and oscillation limit value $p_{dyn,O}$, or according to the values for starting differential pressure amount $e_S$ and oscillation differential pressure amount $e_{Osz}$. FIG. 6 shows a total of six time diagrams, wherein in the first time diagram a) the dynamic rail pressure $p_{dyn}$ is applied against time t. At the same time, target high pressure $p_S$ is indicated as a horizontal dashed line. FIG. 6 also shows in five additional time diagrams the temporal progression of logic variables b) flag7, c) flag8, d) flag9, e) flag10, and f) the temporal progression of engine stop signal MS. For the sake of better legibility—as in the following where necessary—logic variables are also abbreviated in this drawing, i.e. FlagX is identified as "MX", as previously explained.

According to FIG. 6A), dynamic rail pressure control deviation $e_{dyn}$ reaches at a fifth time point $t_5$ the starting differential pressure amount $e_S$. Thus, at this time dynamic rail pressure $p_{dyn}$ is identical with starting high pressure $p_{dyn,S}$. In addition to the previously already discussed checks, an additional check is to be conducted at the fifth time point $t_5$ in accordance with the herein disclosed method, as to whether previously during the oscillation time interval $\Delta t_{L,O}$ a high pressure oscillation occurred. For this purpose, the progression of dynamic rail pressure $p_{dyn}$ is analyzed, wherein this is performed with the assistance of logic variables flag7, flag8 and flag9, which according to the logic explained below are set, reset and evaluated.

To detect a high pressure oscillation it is checked whether dynamic rail pressure control deviation $e_{dyn}$ has reached or exceeded oscillation differential pressure amount $e_{Osz}$. This is the case herein at an initial time point to wherein dynamic rail pressure $p_{dyn}$ drops below the target high pressure $p_S$ and reaches oscillation limit value $p_{dyn,O}$. As shown in b) and as explained further in connection with FIG. 8, flag7 is set here to value 1. Dynamic rail pressure $p_{dyn}$ consequently drops further, then rises again and at a second point in time $t_2$ reaches again oscillation limit value $p_{dyn,O}$, so that the dynamic rail pressure control deviation $e_{dyn}$ is again identical with oscillation differential pressure amount $e_{Osz}$. Dynamic rail pressure $p_{dyn}$ consequently rises further and at a third point in time $t_3$ reaches again target high pressure $p_S$. Under b) and c) it is illustrated that at the same time flag7 is reset to value 0 and flag8 is set to value 1. Dynamic rail pressure $p_{dyn}$ subsequently rises to above target high pressure $p_S$, then drops again to below target high pressure $p_S$ and at a fourth point in time $t_4$ reaches again oscillation limit value $p_{dyn,O}$, so that the dynamic rail pressure control deviation $e_{dyn}$ is again identical with oscillation differential pressure amount $e_{Osz}$. Under c) and d) it is illustrated that now simultaneously flag0 is reset to value 0 and flag9 is set to value 1. Dynamic rail pressure $p_{dyn}$ subsequently drops further and, at a fifth point in time is reaches the starting high pressure $p_{dyn,S}$ so that dynamic rail pressure control deviation $e_{dyn}$ is identical to starting differential pressure amount $e_S$. At this fifth time point $t_5$ it is now decided whether or not the continuous injection detection is to be performed. A criterion for this is in particular whether or not flag9 is set and whether time difference $\Delta t_{Osz}$, which is calculated in sixteenth sub-step S6_16 and the calculation of which is incidentally discussed in further detail below in connection with FIG. 8, is less than or the same as oscillation time interval $\Delta t_{L,O}$. Oscillation time interval $\Delta t_{L,O}$ is herein drawn as the difference between fifth time point $t_5$ and a first time point $t_1$ which is determined by the oscillation time interval $\Delta t_{L,O}$, originating from fifth time point $t_5$ as a starting time. In the specific current case, time difference $\Delta t_{Osz}$ is calculated as:

$$\Delta t_{Osz}=t_5-t_2.$$

This ultimately means that, for detection of a high pressure oscillation within oscillation time interval $\Delta t_{L,O}$, the dynamic rail pressure $p_{dyn}$ has respectively exceeded from below, initially the oscillation limit value $p_{dyn,O}$ and thereafter the target high pressure $p_S$, and has subsequently reached or dropped below the lower starting high pressure $p_{dyn,S}$ so the function of continuous data injection detection is not started. In other words, the dynamic rail pressure $p_{dyn}$ must pass through a band with width $e_{Osz}$ below target high pressure $p_S$—first upward, and subsequently downward—within oscillation time interval $\Delta t_{L,O}$, and must ultimately have dropped further, so that dynamic rail pressure control deviation $e_{dyn}$ reaches or exceeds the starting differential pressure amount $e_S$ so that continuous injection detection is not started. This band is identified by hatching in FIG. 6.

If flag9 is set at fifth time point $t_5$, it is now reset. As becomes clear from the program sequence according to FIGS. 4, 5 and 8, flag7 is again set in a later step of the program sequence—not terminated in FIG. 6—wherein due to the insufficient resolution of the individual discrete time steps of the program sequence this is indicated in FIG. 6, simultaneously with fifth time point $t_5$. In addition—referring to e)—flag10 is set at the fifth time point $t_5$.

After the fifth time point $t_5$, dynamic rail pressure $p_{dyn}$ initially drops further, then rises again and at a sixth time point $t_6$ reaches again target high pressure $p_S$. Flag7 is then reset to value 0 and flag8 is again set to value 1. Flag10 is reset to value 0, so that now the continuous injection detection function can again be released.

Since in FIG. 6 an exemplary case is illustrated, wherein a high pressure oscillation is detected within oscillation time interval $\Delta t_{L,O}$ at the fifth time point $t_5$, engine stop signal MS is not set, as illustrated under f). A shut-down of internal combustion engine 1 is thus avoided.

FIG. 7 shows a diagrammatic view of the already previously discussed second design variant of the embodiment of the method according to FIGS. 4 and 5, wherein in this case according to the second design variation oscillation limit value $p_{dyn,O}$ is selected to be less than starting high pressure $p_{dyn,S}$. Accordingly, oscillation differential pressure amount $e_{Osz}$ is thus greater here than starting differential pressure amount $e_S$. It is emphasized that the logic discussed herein in connection with the second design variant is also applicable in a case where the oscillation limit value $p_{dyn,O}$ is equal to starting high pressure $p_{dyn,S}$, so that then the oscillation differential pressure amount $e_{Osz}$ is also equal to the starting differential pressure amount $e_S$.

The second design variant manages without logic variable flag7. The latter is nevertheless optionally defined in one implementation of the herein disclosed method, if the method is to be executable for both design variants, wherein it is then merely not used in sixth sub-step S6_6 according to FIG. 5.

FIG. 7 illustrates five time diagrams, namely: a) again dynamic rail pressure $p_{dyn}$ applied against time t; b) temporal progression of logic variable flag8; c) temporal progression of logic variable flag9; d) temporal progression of logic variable flag10 and finally e) temporal progression of engine stop signal MS.

Under a) it is shown that dynamic rail pressure $p_{dyn}$ initially drops below target high pressure $p_S$, whereby it reaches oscillation limit value $p_{dyn,O}$ at an initial time point to, so that dynamic rail pressure control deviation $e_{dyn}$ becomes equal to oscillation differential pressure amount $e_{Osz}$. Simultaneously, flag8 is set according to b). Subsequently, the dynamic rail pressure control deviation $e_{dyn}$ drops further and then rises again until it is again identical with oscillation differential pressure amount $e_{Osz}$ at a second time point $t_2$. Then, dynamic rail pressure $p_{dyn}$ rises again and at a third time point $t_3$ reaches target high pressure $p_S$. At this time, flag8 is reset to value 0, whereas flag9 is set to value 1. As a result, dynamic rail pressure $p_{dyn}$ rises further and drops subsequently again to below the target high pressure $p_S$ and, at a fourth time point $t_4$ reaches starting high pressure $p_{dyn,S}$. The dynamic rail pressure control deviation $e_{dyn}$ is in this case identical to the starting differential pressure amount $e_S$. Flagg is now reset to value 0. At fourth time point $t_4$ it is decided whether or not continuous injection detection is performed. For this purpose, time difference $\Delta t_{Osz}$ is in particular calculated again, which is discussed below in connection with FIG. 9, wherein according to the following equation, time difference $\Delta t_{Osz}$ is calculated as the difference between fourth time point $t_4$ and second time point $t_2$:

$$\Delta t_{Osz}=t_4-t_2.$$

Time difference $\Delta t_{Osz}$ is compared with oscillation time interval $\Delta t_{L,O}$, wherein this is shown analogous to FIG. 6 also in FIG. 7 as the time period between a first time point $t_1$ and the fourth time point $t_4$, wherein in this case first time point $t_1$ is determined by oscillation time interval $\Delta t_{L,O}$, calculated from fourth time point $t_4$ to the past. If time difference $\Delta t_{Osz}$ is less than or equal to oscillation time interval $\Delta t_{L,O}$ and if at the same time the value of flag9 is equal to 1, a high pressure oscillation is detected within oscillation time interval $\Delta t_{L,O}$ and the continuous injection detection function is not started. To this extent it is shown under d), that flag10 is set to value 1 at fourth time point $t_4$, whereby—as already explained—the continuous injection detection is temporarily blocked. Consequently, dynamic rail pressure $p_{dyn}$ drops further and reaches the oscillation limit value $p_{dyn,O}$ at a fifth time point $t_5$. In this case, the dynamic rail pressure control deviation $e_{dyn}$ is again identical with oscillation differential pressure amount $e_{Osz}$. Flag8 is now again set to value 1. Consequently, dynamic rail pressure $p_{dyn}$ drops further and then rises again and at a sixth time point $t_6$ reaches target high pressure $p_S$. Now flag8 is reset to value 0, whereas flag9 is set to value 1, which previously in a fourth time point $t_4$—namely in fifteenth sub-step S6_15 according to FIG. 5—was reset to 0. In sixth time point $t_6$ flag10 is also reset to value 0, so that now continuous injection detection is again released. Since in the current case—analogous to the illustration in FIG. 6—a high pressure oscillation was detected within the oscillation time interval $\Delta t_{L,O}$ and accordingly no continuous injection detection was performed, no detection of a continuous injection occurs, so that the engine stop signal MS indicates value 0 over the entire time—see e). Undesired shut-down of internal combustion engine 1 is thus avoided.

Analogous to FIG. 6, a crosshatched band of width $e_{Osz}$ is illustrated. The following applies for starting continuous injection detection. If dynamic rail pressure $p_{dyn}$ passes through the crosshatched band within the oscillation time interval $\Delta t_{L,O}$ from the bottom to the top, and enters subsequently again into the band from the top in order to then drop to at least the starting high pressure $p_{dyn,S}$, a high pressure oscillation is identified at fourth time point $t_4$, so that continuous injection detection is not started. In other words, if—within the oscillation time interval $\Delta t_{L,O}$—dynamic rail pressure $p_{dyn}$ exceeds oscillation limit value $p_{dyn,O}$ and subsequently the target high pressure $p_S$, and subsequently drops again below target high pressure $p_S$ to at least the starting high pressure $p_{dyn,S}$, a high pressure oscillation is detected, so that start of continuous injection detection does not occur at fourth time point $t_4$.

FIG. 8 shows a schematic view in the form of a flow chart of the first design variant of the embodiment of the method according to FIGS. 4 and 5; FIG. 8 shows in particular the sixth sub-step S6_6 according to FIG. 5 in the design according to the first design variant. In a first sub-step S6_6_1 it is checked whether dynamic rail pressure control deviation $e_{dyn}$ is greater or equal to oscillation differential pressure amount $e_{Osz}$. If this is the case it is checked in a second sub-step S6_6_2 if flag9 is set, in other words whether it indicates value 1. If this is the case, a second time variable $t_{2O}$ is set in a third sub-step S6_6_3 to the current system time t and the process is subsequently continued in the seventh sub-step S6_7 according to FIG. 5.

If, on the other hand it is determined in a second sub-step S6_6_2 that flag9 is not set, a check is conducted in a fourth sub-step S6_6_4, whether flag 8 is set. If this is the case, flag9 is set to value 1 in a fifth sub-step S6_6_5, the current system time t is assigned to second time variable $t_{2O}$ and finally in a seventh sub-step S6_6_7 flag8 is reset to 0. The process is subsequently continued in the seventh sub-step S6_7 according to FIG. 5.

If, on the other hand it is detected in fourth step S6_6_4, that flag8 is not set, it is checked in an eighth sub-step S6_6_8 whether flag7 indicates value 1. If this is the case, the current system time t is assigned to first time variable $t_{1O}$. The process is subsequently continued in the seventh sub-step S6_7 according to FIG. 5.

If, on the other hand it is detected in eighth sub-step S6_6_8 that flag7 is not set, in other words indicates value 0, value 1 is first allocated to flag7 in a tenth sub-step S6_6_10, wherein subsequently in an eleventh sub-step S6_6_11 the current system time t is assigned to first time variable $t_{1O}$. The process is subsequently continued in the seventh sub-step S6_7 according to FIG. 5.

If it is detected in a first sub-step S6_6_1 that dynamic rail pressure control deviation $e_{dyn}$ has not reached or exceeded oscillation differential pressure amount $e_{Osz}$, the process is continued from that point in a twelfth sub-step S6_6_12. There, it is checked whether the dynamic rail pressure control deviation $e_{dyn}$ is less than 0. By definition this is the case, if dynamic rail pressure $p_{dyn}$ is greater than the target high pressure $p_S$.

If the result of the query in twelfth sub-step S6_6_12 is positive it is checked in a thirteenth sub-step S6_6_13 whether flag9 is set. If this is not the case, in other words if flag9 indicates value 0, the process is continued in a fourteenth step S6_6_14 where it is checked whether flag8 is set. If this is the case, the process is continued in seventh sub-step S6_7 according to FIG. 5. If on the other hand flag8 is not set it is checked in a fifteenth sub-step S6_6_15 whether flag7 is set. If this is not the case, the process is continued in seventh sub-step S6_7 according to FIG. 5. Otherwise, if flag7 is set it is reset to 0 in a sixteenth sub-step S6_6_16, and flag8 is subsequently set in a seventeenth sub-step S6_6_17. The process is subsequently continued in the seventh sub-step S6_7 according to FIG. 5.

If the result of the query in thirteenth sub-step S6_6_13 is positive, flag9 is reset to 0 in an eighteenth sub-step S6_6_18; flag8 is subsequently set in a nineteenth step S6_6_19; further on in a twentieth sub-step S6_6_20 first time variable $t_{1,O}$ is set the same as second time variable $t_{2,O}$. The process is subsequently continued in seventh sub-step S6_7 according to FIG. 5.

If, on the other hand the result of the query in twelfth step S6_6_12 is negative, the process is continued in seventh sub-step S6_7 according to FIG. 5.

The following is shown. First it is indicated via logic variable flag7 when dynamic rail pressure $p_{dyn}$ drops below oscillation limit value $p_{dyn,O}$ for the first time, wherein then subsequently the specific system time is retained in first time variable $t_{1,O}$ at which dynamic rail pressure $p_{dyn}$ again reaches the oscillation limit value $p_{dyn,O}$ from below. Subsequently, logic variables flag8 and flag9 are alternately set and reset, and the current system time t is repetitively assigned to second time variable $t_{2,O}$; wherein the current value of second time variable $t_{2,O}$ is assigned to first time variable $t_{1,O}$ always when the dynamic rail pressure $p_{dyn}$ reaches the target-high pressure $p_S$ from below, without first exceeding starting high pressure $p_{dyn,S}$. This is continued for the duration of the high pressure oscillation, or until dynamic rail pressure $p_{dyn}$ reaches starting high pressure $p_{dyn,S}$ for the first time from above, whereby this defines the starting time. The duration of the last oscillation period is then calculated as a time difference $\Delta t_{Osz}$ in that the difference is constructed from the starting time and the current value of the first time variable $t_{1,O}$.

FIG. 9 shows a schematic representation of the second design variant according to FIG. 7 of the embodiment of the method according to FIGS. 4 and 5, wherein again, the functionality of sixth sub-step S6_6 according to FIG. 5 is described according to the second design variant. For the second design variant—as already described—only the two logic variables, flag8 and flag9, are required, whereas logic variable flag7 is not used. For the remainder, the functionality is analogous to the previously described functionality of the first design variant, whereby herein logic variables, flag8 and flag9, are set and reset alternately and the first time variable $t_{1,O}$ is updated in a suitable manner. Second time variable $t_{2,O}$ is however also not required here, in as far as the second design variant is kept simpler than the first design variant.

In a first sub-step S6_6_1 it is also checked according to the second design variant, whether dynamic rail pressure control deviation $e_{dyn}$ is greater than or equal to oscillation differential pressure amount $e_{Osz}$. If this is the case, it is checked in a second sub-step S6_6_2 whether flag9 is set. If this is the case, the process is continued in seventh sub-step S6_7 according to FIG. 5. If, on the other hand, flag9 indicates value 0 it is checked in a third sub-step S6_6_3 whether flag8 is set. If this is not the case, flag8 is set in a fourth sub-step S6_6_4; otherwise the process is continued in a fifth sub-step S6_6_5, skipping sub-step S6_6_4. In fifth sub-step S6_6_5, the current system time t is assigned to first time variable $t_{1,O}$. This fifth S6_6_5 is also carried out if fourth sub-step S6_6_4 is carried out. Subsequent to fifth sub-step S6_6_5, the process is continued in seventh sub-step S6_6_7 according to FIG. 5.

If, in on the other hand, it is detected in first sub-step S6_6_1 that dynamic rail pressure control deviation $e_{dyn}$ is less than oscillation differential pressure amount $e_{Osz}$ it is checked in a sixth sub-step S6_6_6 whether dynamic rail pressure control deviation $e_{dyn}$ is less than 0. If this is not the case, the process is continued in seventh sub-step S6_7 according to FIG. 5. If, on the other hand, the result of the query in sixth sub-step S6_6_6 is positive, it is checked in seventh sub-step S6_6_7 whether flag8 is set. If this is not the case, the process is again continued in seventh sub-step S6_7 according to FIG. 5. If, in contrast, the result of the query in seventh sub-step S6_6_7 is positive, flag8 is reset to value 0 in an eighth sub-step S6_6_8. Subsequently in a nineth sub-step S6_6_9, flag9 is set to value 1. Subsequently, the process is continued in seventh sub-step S6_7 according to FIG. 5.

In overall terms, the procedure proposed herein prevents false positive detection of continuous injection in the event of oscillations in the high pressure, which may for example be caused by intake air. Undesirable generating of a false alarm, and in particular shutting down of internal combustion engine 1, is thus avoided. This increases the operational safety of internal combustion engine 1, wherein internal combustion engine 1 remains nevertheless protected against continuous injection.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for operating an internal combustion engine with a high pressure accumulator for a fuel injection system, the method comprising the steps of:

monitoring, by a control unit, in a time-dependent manner, a high pressure in the fuel injection system;

conducting, by the control unit, a check, at a high pressure-dependent starting time point, as to whether a continuous injection detection is to be carried out, the high pressure-dependent starting time point being a starting time, the starting time being when the continuous injection detection occurs if the continuous injection detection is to be carried out, wherein the check includes checking, by the control unit, whether a high-pressure oscillation has occurred within a predetermined oscillation time interval prior to the starting time such that the starting time is a same time as an end time point of the predetermined oscillation time interval and such that the high-pressure oscillation includes the high pressure passing through—from below and thereby exceeding—a predetermined oscillation limit value that is below a high pressure target value, subsequently exceeding the high pressure target value, and subsequently dropping to a predetermined oscillation end value that is below the high pressure target value and that correlates with the end time point, and thereby the high pressure of the high-pressure oscillation passes upwardly through a band located below the high pressure target value within the predetermined oscillation time interval, the band having a predetermined width that is an oscillation differential pressure amount.

2. The method according to claim 1, wherein the continuous injection detection is:

(a) carried out if the high-pressure oscillation is not detected within the predetermined oscillation time interval; and (b) is not carried out if the high-pressure oscillation is detected within the predetermined oscillation time interval.

3. The method according to claim 1, wherein after detecting the high-pressure oscillation, the continuous injection detection is blocked until the high pressure has again reached or exceeded the high pressure target value.

4. The method according to claim 1, wherein the high pressure-dependent starting time point is a time point at which the high pressure drops below the high pressure target value by a predetermined starting differential pressure amount.

5. The method according to claim 1, wherein the predetermined oscillation limit value is selected to be one of:

a) less than a predetermined starting high pressure; and b) greater than the predetermined starting high pressure.

6. The method according to claim 1, wherein, the predetermined oscillation end value is selected to be equal to a starting high pressure.

7. An injection system for an internal combustion engine, comprising:

at least one injector;

a high pressure pump;

a fuel reservoir;

at least one high pressure accumulator, which is fluidically connected with the at least one injector and via the high pressure pump with the fuel reservoir;

a high pressure sensor arranged and configured for detecting a high pressure in the injection system; and a control unit which is operatively connected with the at least one injector and with the high pressure sensor, the control unit being configured for:

monitoring a high pressure in the injection system in a time-dependent manner;

checking at a high pressure-dependent starting time point whether a continuous injection detection is to be carried out, the high pressure-dependent starting time point being a starting time, the starting time being when the continuous injection detection occurs if the continuous injection detection is to be carried out, wherein the step of checking includes checking whether a high-pressure oscillation has occurred within a predetermined oscillation time interval prior to the starting time such that the starting time is a same time as an end time point of the predetermined oscillation time interval and such that the high-pressure oscillation includes the high pressure passing through—from below and thereby exceeding—a predetermined oscillation limit value that is below a high pressure target value, subsequently exceeding the high pressure target value, and subsequently dropping to a predetermined oscillation end value that is below the high pressure target value and that correlates with the end time point, and thereby the high pressure of the high-pressure oscillation passes upwardly through a band located below the high pressure target value within the predetermined oscillation time interval, the band having a predetermined width that is an oscillation differential pressure amount.

8. An internal combustion engine, comprising:
an injection system, including:
at least one injector;
a high pressure pump;
a fuel reservoir;
at least one high pressure accumulator, which is fluidically connected with the at least one injector and via the high pressure pump with the fuel reservoir;
a high pressure sensor arranged and configured for detecting a high pressure in the injection system; and
a control unit which is operatively connected with the at least one injector and with the high pressure sensor, the control unit being configured for:
monitoring a high pressure in the injection system in a time-dependent manner;
checking at a high pressure-dependent starting time point whether a continuous injection detection is to be carried out, the high pressure-dependent starting time point being a starting time, the starting time being when the continuous injection detection occurs if the continuous injection detection is to be carried out,
wherein the step of checking includes checking whether a high-pressure oscillation has occurred within a predetermined oscillation time interval prior to the starting time such that the starting time is a same time as an end time point of the predetermined oscillation time interval and such that the high-pressure oscillation includes the high pressure through—from below and thereby exceeding—a predetermined oscillation limit value that is below a high pressure target value, subsequently exceeding the high pressure target value, and subsequently dropping to a predetermined oscillation end value that is below the high pressure target value and that correlates with the end time point, and thereby the high pressure of the high-pressure oscillation passes upwardly through a band located below the high pressure target value within the predetermined oscillation time interval, the band having a predetermined width that is an oscillation differential pressure amount.

* * * * *